United States Patent
Aukia et al.

(10) Patent No.: US 6,594,268 B1
(45) Date of Patent: *Jul. 15, 2003

(54) ADAPTIVE ROUTING SYSTEM AND METHOD FOR QOS PACKET NETWORKS

(75) Inventors: Petri Aukia, Eatontown, NJ (US); T. V. Lakshman, Eatontown, NJ (US); Debasis Mitra, Summit, NJ (US); Kajamalai G. Ramakrishnan, Berkeley Heights, NJ (US); Dimitrios Stiliadis, Middletown, NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/266,622

(22) Filed: Mar. 11, 1999

(51) Int. Cl.⁷ .............................................. H04L 12/28

(52) U.S. Cl. ...................... 370/400; 370/230; 370/235

(58) Field of Search ................................. 370/230, 231, 370/232, 233, 234, 235, 400, 401, 468, 389, 411, 236

(56) References Cited

U.S. PATENT DOCUMENTS

| | | | | |
|---|---|---|---|---|
| 5,838,663 A | * | 11/1998 | Elwalid et al. ............. | 370/233 |
| 6,011,776 A | * | 1/2000 | Berthaud et al. ........... | 370/232 |
| 6,188,698 B1 | * | 2/2001 | Galand et al. .............. | 370/412 |
| 6,240,463 B1 | * | 5/2001 | Benmohamed et al. ...... | 709/238 |
| 6,246,669 B1 | * | 6/2001 | Chevalier et al. ........... | 370/238 |
| 6,310,881 B1 | * | 10/2001 | Zikan et al. ................ | 370/401 |

OTHER PUBLICATIONS

"Computational results of a interior point algorithm for large scale linear programming" by N. K. Karmarkar and K. G. Ramakrishnan; Mathematical Programming 52 (1991), pp. 555–586.

"VPN Designer: A tool for Design of Multiservice Virtual Private Networks" by K. G. Ramakrishnan, Debasis Mitra, and John A. Morrison; Proc. Networks 98, (1998); pp. 1–16.

(List continued on next page.)

Primary Examiner—Hassan Kizou
Assistant Examiner—Saba Tsejaye
(74) Attorney, Agent, or Firm—Mendelsohn and Associates, PC

(57) ABSTRACT

A packet network employs routers that determine network routing based on quality of service (QoS) provisioning parameters and network topology information. QoS provisioning parameters are provided to each router from a network management database, and the network topology information is determined from a link state database of the router. The link state database may include network topology information collected by the router in accordance with the open shortest path protocol (OSPF). A network link, router, or other node failure initiates a new path-selection process. First, a temporary set of provisioning entries may be determined with a shortest path first (SPF) routing method. Then, the network packet flows may be classified into packet flows, real-time and non-real-time, and then as packet flows that require reserved bandwidth or that may be multiplexed. A multicommodity flow (MCF) routing method is then employed to determine an optimized set of candidate provisioning entries for the packet flows that may be multiplexed. The MCF routing method determines new routing for the packet flows based on QoS provisioning commitments as parameters. The MCF routing method determines the new routing based on an optimization criterion, such as maximized revenue. Once the new routing is determined, routing of network traffic is enabled by converting the provisioning entries into filter rules, which are then loaded into the packet classifier of the router.

19 Claims, 10 Drawing Sheets

OTHER PUBLICATIONS

"ATM Network Design and Optimization: A Multirate Loss Network Framework" by Debasis Mitra, John A. Morrison and K. G. Ramakrishnan; IEEE/ACM Transactions On Networking, vol. 4, Aug. 1996.

"Talisman: An Integrated Set of Tools for ATM Network Design and Optimization" by Debasis Mitra, John A. Morrison and K. G. Ramakrishnan; Proc. Networks 96, Sydney, Dec. 1996.

"A New Approach for Allocating Buffers and Bandwidth to Heterogeneous, Regulated Traffic in an ATM Node" by Anwar Elwalid, Debasis Mitra, and Robert H. Wentworth, IEEE Journal On Selected Areas In Communications, vol. 13, No. 6, Aug. 1995.

"Refined Asymptotic Approximation to Loss Probabilites and Theur Sensitivies in Shared Unbuffered Resources" by John A. Morrison, K. G. Ramakrishnan and Debasis Mitra; SIAM J. Appl. Math 59 No. 2, Nov. 1998 (p. 494–513) (Copy provided is a reprint).

* cited by examiner-

FIG. 6

| LS age | | | OPTIONS | | 1. ROUTER-L | |
|---|---|---|---|---|---|---|
| LINK STATE ID ||||||||
| ADVERTISING ROUTER ||||||||
| LS SEQUENCE NUMBER ||||||||
| LS CHECKSUM ||| LENGTH ||||
| 0 | V | E | B | 0 | # LINKS ||
| LINK ID |||||||
| 602↙ LINK DATA |||||||
| TYPE || 2. #TOS | METRIC ||||
| THROUGHPUT, 8 || 0 | BANDWIDTH ||||
| RELIABILITY, 4 || 0 | MARKER | A | H | V | 0 |
| LINK ID |||||||
| LINK DATA |||||||

| LS age | OPTIONS | 10. AREA-LOCAL | | |
|---|---|---|---|---|
| Opaq.t: 128 | OPAQUE ID ||||
| ADVERTISING ROUTER |||||
| LS SEQUENCE NUMBER |||||
| LS CHECKSUM | LENGTH ||||
| HASH OF THE RUNNING SET |||||
| HASH OF THE CANDIDATE SET |||||
| HASH OF THE WORKING SET |||||

701, 705, 706, 707

ADAPTIVE ROUTING SYSTEM AND METHOD FOR QOS PACKET NETWORKS

BACKGROUND OF THE INVENTION

1. Field of the Invention

The present invention relates to packet networks, and, more particularly, to adaptive routing of packets in a communications network based on quality of service provisioning.

2. Description of the Related Art

Packet network service providers, such as those providing Internet Protocol (IP) networks, are presently developing and providing differentiated services. In particular, service providers are interested in differentiated services as part of provisioning and maintaining networks for customers with a variety of voice and data needs. For example, virtual private networks (VPNs) allow service providers to establish and tear-down connections for a large number of users, while billing only one customer or client (e.g., a large corporation or government agency) for the service. However, the customer or client may require a certain amount of guaranteed bandwidth, minimum transport delay, or other metric for some or all of the data transported through the VPN. Service providers generally desire a higher revenue for data transported through the VPN when a customer demands such differentiated services.

In the art, the term "physical path" denotes the path between source and destination pairs for a given communication stream of data, or packet flow, together with intermediate nodes, if any, and the physical links that connect the nodes. In networks of practical size and complexity, many sets of multiple physical paths may exist, each provisioned to carry one or more corresponding packet flows. The network operator may specify a predetermined bandwidth for the corresponding stream or packet flow along each link of the possible physical paths. The specified bandwidth may equal the full bandwidth, or some quantity less than the full bandwidth, or no bandwidth at all. Although a physical path may exist between a source and destination pair, the full bandwidth of the physical path links may be unavailable for the corresponding packet flow.

In addition, the term "logical path" (also called a "virtual path") denotes a path between a given source and destination pair as defined by connection metrics, such as delay or bandwidth. Logical (virtual) paths are not determined purely by physical considerations, but instead are partly defined by parameters that may be specified and/or changed. Individual virtual paths may require less than the fully assigned bandwidth physically available on the physical links that the paths occupy. Thus, several virtual paths may co-exist along part or all of a physical path, allowing each physical link of the network to simultaneously support several virtual paths.

Packet networks that provide differentiated services generally include a routing method that allows the network to determine a logical path through the network from a given source to a given destination. The routing method may be part of a process performed in each router of the network. Each router may learn the network topology by exchanging link and router information between directly connected routers. Once the router determines the network topology, the router may employ a path-selection process that determines the logical path through a network between the source and destination pair over the physical links according to-predefined connection metrics. Each router determines the same logical path through the packet network given the same information. Packets received by each router are then routed along the determined path.

A standard protocol employed by IP networks to determine network topology and link routing is the Open Shortest Path First (OSPF) protocol, as outlined in J. Moy, "OSPF Version 2," Internet Draft, Request for Comment (RFC) 2178, July 1997. The OSPF protocol employs the destination (i.e., shortest path to destination) as the metric for the path-selection process. However, with destination as the only metric, only a "best effort" is employed to route packet flows. Best effort implies that, while the packets are re-routed, no other QoS provisioning commitment, such as minimum bandwidth, delay or loss, applies to the packet flow. Routers of the prior art may route packets based on other factors, such as available bandwidth. However, when the OSPF protocol is employed as the routing method, distribution of packet flows over the links is based on shortest path and not provisioned QoS commitments.

Routing methods may determine logical paths and allocate corresponding bandwidth to the links in the network, with such allocation according to the source and destination pair, subnetwork, and class of service. This path-selection method or determination may be referred to as logical network design. One important element of logical network design is selection of a set of physical paths through the network having sufficient capacity for carrying the estimated traffic of a communication stream or packet flow. The routing method may base the determination on such factors as the network topology, the currently available buffer space at the nodes, and the currently available link capacities.

Significantly, the network operator may have QoS commitments with its customers, such as guaranteed bandwidth or maximum cell-loss probability. The path-selection process may account for such commitments, but the routing method may require simplifications to characterize variable traffic characteristics in a form that the routing method can use for logical path determination. For example, certain networks, particularly high-speed networks, may support the networking protocol known as asynchronous transfer mode (ATM). Such high-speed networks typically carry multiple services having different traffic characteristics, including both constant bit rate traffic and variable bit rate traffic. An important simplification for routing methods considering variable bit rate traffic in networks, such as ATM networks, is provided by the concept of "effective bandwidth."

Effective bandwidth of a packet flow defines the bandwidth of the packet flow in terms of the node buffer size and the average and peak rates of the packet flow, assuming the node operates with a leaky bucket regulator. An effective bandwidth may be determined for each packet flow, of a network where the packet flows are multiplexable, the total effective bandwidth of all packet flows is less than or equal to the total network capacity, and the packet flows exhibit loss-less performance. (i.e., the packet flows may be rearranged over multiple physical paths while maintaining desired delay or bandwidth for each packet flow). For networks having both multiplexable and non-muliplexable packet flows, the two types of traffic may be separately analyzed, with portions of the total network capacity allocated to each traffic type.

Effective bandwidth, and allocation of bandwidth and buffer capacity based on effective bandwidth, is described in detail in A. Elwalid et al., "A New Approach For Allocating Buffers and Bandwidth to Heterogeneous, Regulated Traffic in an ATM Node," *IEEE Journal on Selected Areas in Communications*, Vol. 13, No. 6, (August 1995) 1115–1127

(incorporated herein by reference and referred to as "Elwalid et al."). A routing algorithm that accounts for variable bit rate traffic in ATM networks with effective bandwidth, is described in detail in U.S. Pat. No. 5,838,663, issued on Nov. 11, 1998 entitled "A Method for Admission Control and Routing by Allocating Network Resources in Network Nodes", which is incorporated herein by reference.

Once logical paths are specified, the routers of the network generally must support at least two types of messages for the packet flows and network administration: data messages and control messages. Data messages are packets containing user information transported between the source and destination pair. Control messages are messages interpreted by network elements, such as the routers, to administer connections and exchange network information. These control messages may be employed to ensure that the packets are interpreted and routed in a manner that provides the desired commitment of the path-selection process. Control messages may be included in packet headers, or may be separate and distinct packets.

One approach of the prior art for providing differentiated services employs type-of-service (TOS) bits defined in the packet header, or TOS addressed metrics in the packet payload. The TOS bits are interpreted by routers within the network in an agreed upon manner so that each network node provides the desired QoS commitments of the service when routing the packet flow. This approach may allow for distribution of each and all resource requests to all nodes of the network. Alternate approaches may be reservation-based and may employ signaling to reserve network resources for the duration of a packet flow, or packet flow aggregates. A protocol to signal reservation of network resources in a network is the Reservation Setup Protocol (RSVP). RSVP, as an example, may be used in conjunction with service models, such as guaranteed rate and controlled load service models, to request the desired QoS commitments for certain flows.

Once the connection is established, the router includes a routing fabric to physically route packets received at input ports to specific output ports for transport to the next node or destination. Packet filters may be employed with the routing fabric to determine actions to be taken for packets having certain source and destination addresses arriving at the router. Actions may be that routing of packets sent from one or more of specified sources is denied (e.g., actions for "firewall" or security purposes), or that a specific action is to be taken for that packet having a specified source address (e.g., actions for routing to a specific, alternate destination). The router may be provided with a table or list of filter rules specifying the desired actions for corresponding field addresses. The packet filter allows the router to associate fields of received packets with the table or list entries.

Packets comprise, for example, a header and a payload that may include user data. A header of the packet includes fields or parameters, such as a source address where the data originates and at least one destination address where the data is to be routed. Another parameter in the header may be a protocol type identifying a particular protocol employed in the communication network. Source and destination addresses may be logical addresses of end hosts. The header may also include, for example, certain types of flags in accordance with protocol type, such as TCP, depending upon the receiver or transmitter application.

The IP packet header fields typically contain up to 128 bits of parameter information, including source and destination addresses, physical source and destination port numbers, interface number, protocol type, etc. Filter rules may also specify, for example, that for received packets with fields in the header specifying a particular destination address, the packet should or should not be forwarded through specific output links or output ports. Thus, a variety of filter rules may be implemented based on packet field information. For example, such filter rules might be based on 1) source addresses; 2) destination addresses; 3) source ports; 4) destination ports; and/or 5) any combination of these fields. Consequently, such packet filtering may be employed by layer four switching applications.

Each of the fields or parameters in the header may be represented as points along an axis of a dimension. The general packet classification problem of a packet filter may then be modeled as a point-location in a multi-dimensional space. One or more field values of the packet define a point in the multi-dimensional space. A packet filter rule associated with a range of values in each dimension defines an object in the multi-dimensional space.

A point-location algorithm in a multi-dimensional space with multi-dimensional objects finds the object that a particular point belongs to. Given a received point $EP=\{E_1, E_2, \ldots E_D\}$ in a space having D dimensions, the point-location algorithm finds one or more of a set of n D-dimensional objects including the point EP (n being an integer greater then 0). The general case of D>3 dimensions may be considered for the problem of packet classification. For the special case of two dimensions, the filter rules defined for field ranges are modeled as objects in two dimensions, forming rectangles in the 2-dimensional space. The specific case of filter rules defined for field ranges that are modeled as objects in two dimensions may correspond to switching of packets through a routing fabric based on source address/port and destination address/port.

Once the physical and logical paths through the network are determined, network resources are reserved through the nodes of the network when a link is established and packet flows between source and destination pairs begin. However, when a link is broken, such as by a disconnected T 1, T3, or fiber-optic connection to an interface card of the network node, or when a node fails, such as when a router fails, the routing mechanism must determine alternate paths through the network to re-establish the packet flows.

Since packet network links are generally in a state of flux, service providers may not be able to effectively provide QoS provisioning, and hence receive revenue, when re-routing does not effectively preserve the QoS commitments to the VPN. Routing mechanisms of the prior art currently route packets through the network based on destination address. Reservation-based protocols alone may only request bandwidth for a link to be established, with no guarantee of success of the request.

SUMMARY OF THE INVENTION

The present invention relates to adaptive routing, and more particularly to generating new routing paths through a router of a packet network. Generating new routing paths may occur when new paths for packet flows are desired because a trigger event, such as a node/link failure or a network topology/provisioning change, occurred in the packet network. In accordance with the present invention, 1) network topology information and 2) quality of service (QoS) provisioning information are collected for each packet flow through one or more routers of the packet network. A path for each packet flow is determined using a general routing optimization method, such as a multicommodity flow routing method, based on the QoS provisioning and network topology information. A set of one or more filter rules is generated for the router based on the one or more paths for the one or more packet flows passing through the router, each filter rule defining a physical path for one or more packet flows through the router. A selected filter rule is applied to each packet of a packet flow to cause each packet to traverse the corresponding path through the router.

The present invention may allow for adaptive routing using packet classification with filter rules. New path routing may be generated as provisioning entries generated by a multicommodity flow-based routing method using network topology information and quality of service (QoS) provisioning information. The provisioning entries may then be translated into filter rules of a packet classifier that implements the new routing paths, thereby implementing adaptive routing in accordance with the present invention.

BRIEF DESCRIPTION OF THE DRAWINGS

Other aspects, features, and advantages of the present invention will become more fully apparent from the following detailed description, the appended claims, and the accompanying drawings in which:

FIG. 6 shows an exemplary line format of an OSPF packet showing the position of the type of service bits;

FIG. 7 shows an exemplary line format of an advertisement packet based on an OSPF packet that may be employed with the present invention;

DETAILED DESCRIPTION

Figure 1:
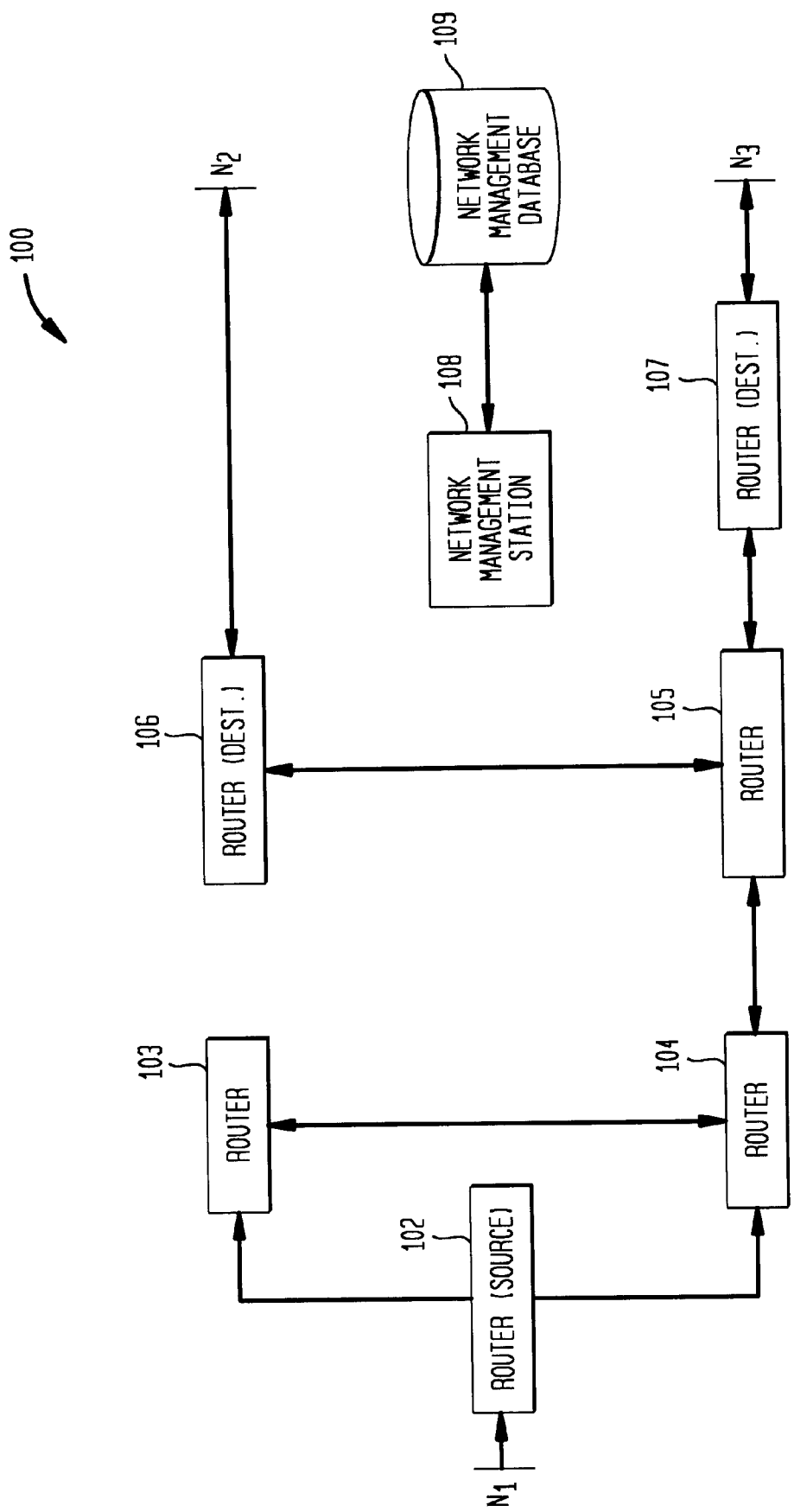
FIG. 1 shows block diagram of a packet network employing adaptive routing in accordance with the present invention.

FIG. 1 shows block diagram of a packet network 100 employing adaptive routing in accordance with the present invention. The packet network 100 includes network routers 102–107, and a network management station 108. For convenience of the following described embodiments, the routers are defined as a source router 102 in communication over a link with destination routers 106 and 107 through intermediate routers 103, 104 and 105. The data path established through links between the source router 102 and destination routers 106 and 107 may be employed to transfer information, or communication streams of data, by packet sequences defined as packet flows. Each packet of the packet sequences may have a header including a source address, source port range, destination address, and destination port range.

Each of the routers 102–107 may typically support an Internet Protocol (IP), for example, and provide for Quality of Service (QoS) provisioning for links of the network. These routers are interconnected by links, which are physical transport media such as T1s, T3s, or optical fiber (e.g., SONET links such as OC1, OC3). However, the present invention is not limited to these fixed or wired types of networks, and is not limited by link-layer characteristics. Each link has a capacity defined in terms of, for example, total available channels, bandwidth, bit-error rate and delay. Each link capacity provides a portion of total available capacity of packet network 100.

Network management station (NMS) 108 (e.g., a central provisioning station for a virtual private network (VPN)) allows network administrators to remotely allocate transmission capacity of routers and links between a source and a destination pair (source-destination pair) within the network. A given VPN may comprise many source-destination pairs. For such purposes, the NMS 108 maintains a network management database 109 of addresses corresponding to the source-destination pairs, and a pair is also identified by the address fields in the header of a network packet. Central provisioning of packet network 100 also includes QoS provisioning, and so each source-destination pair is assigned specified QoS commitments for packet flows corresponding to the source-destination pair.

The source-destination pair defines point-to-point traffic through the packet network 100, where "point" refers to the ingress (source) or egress (destination) network element. For networks following the OSPF protocol, the point may typically be a border router for transit traffic. Source router 102 is shown as an ingress point from external network $N_1$, while the destination routers 106 and 107 are shown as egress points to networks $N_2$ and $N_3$, respectively.

For packet network 100, packet flows may be classified by header information, and grouped into classes, super-classes, or groups of super-classes according to source address ranges and destination address ranges. Classes may be associated with packet flows with common QoS commitments. Super-classes, or groups of super-classes may be associated with virtual private networks (VPNs). Desirably, ranges of source and destination addresses are contiguous for each class, super-class, or groups of super-classes. The packet network 100 may employ a message of a protocol to request resources. Such message may be, for example, Type of Service (TOS) bits of the OSPF protocol in the packet header, TOS addressed metrics of the packet payload, or the control messages of the RSVP protocol. Such resource requests may allocate bandwidth for packet flows from the source 102 to one or more of the destinations 106 and 107 through the network routers 103, 104, and 105.

QoS provisioning specifies certain minimum allowed characteristics of the transmission capacity of the network to be assigned to provisioned packet flows between source-destination pairs. Transmission capacity may be directly related to the capacity of the links in the network, and such characteristics for the packet flows may be bandwidth, delay, and loss (i.e., probability of a lost packet). Such characteristics may be related through available buffers of the router. The QoS provisioning associated with addresses of each source-destination pair is also maintained in the network management database 109. QoS provisioning may also include associated revenue and cost corresponding to each QoS provisioning characteristic, which revenue and cost may be related to revenue paid to service providers by clients based on minimum levels of QoS characteristics provided to packet flows and the cost of providing network connectivity, respectively.

Table 1 shows an exemplary provisioning table for QoS link provisioning of a packet flow as employed by a router in accordance with the present invention.

TABLE 1

| Router | Field | Description |
| --- | --- | --- |
| Router | Class | Defined traffic class |
| Router | Revenue | The relative value of routing the packet flow according to a predefined metric |
| Router | VPN-ID | An identifier for the client or VPN that the packet flow belongs to |
| Source | OSPF-ID | The identifier (ID) of the source router where the packet flow originates (here identified as an OSPF protocol router) |
| Source | Ingress Interface | The interface, or port, number, of the interface of the ingress router that receives the packet flow |
| Source | IP_addr_range | The range of source addresses that constitute the source of the packet flow |
| Destination | OSPF ID | The ID of the destination router that is the destination of the packet flow |
| Destination | Egress interface | The interface, or port, number(s), of the interface of the egress router that provides the packet flow |
| Destination | Next hop | The address for the node or router that receives the packet flow from the egress router |
| Destination | IP_addr-range | The range of destination addresses that constitute the destination of the packet flow |

As shown in Table 1, each packet flow may be identified with Class field, Revenue field values, and VPN-ID field, in addition to the typical provisioning information associated with the source-destination pairs through the routers of the network. The VPN-ID field value may be employed to associate the packet flow with a particular network client or virtual private network, and the Revenue field value is related a relative value of the packet flow to revenue generated for the network by the packet flow. The value for the Revenue field may not necessarily be a monetary quantity, but other network costs may be included (such as maintenance, lost capacity, connectivity costs, or provisioning costs). The QoS provisioning commitments may be associated with a class field value, and exemplary QoS provisioning commitments associated with a Class field are given in Table 2 for a router including a leaky bucket regulator.

TABLE 2

| Field | Function |
| --- | --- |
| rate (r) | Average rate of the packet flow in bytes per second, or may be a token refresh rate for the leaky bucket regulator |
| bucket | Maximum number of packets that may be sent before a refresh of the bucket of the bucket regulator or depth |
| peak (p) | Maximum rate of the packet flow in bytes per second. |
| min | Minimum packet size, which may be employed to calculate a maximum or worst case expansion of traffic for a packet flow. |
| max | Maximum packet size, which may be employed to determine the number of bytes in the bucket. |

TABLE 2-continued

| Field | Function |
| --- | --- |
| delay | Maximum sustainable end-to-end delay in microseconds, which may be related to the maximum per hop delay, dp (if total maximum number of hops $n_{max}$ is known. |
| lossreq | The maximum sustainable packet loss rate for which the packet flow may operate reliably. |

The values for the fields shown in Table 2, such as rate, bucket, delay and loss of a leaky bucket regulator, may be related to the bandwidth available on specified links.

Each of the routers 102–107 comprises a processing section implementing the adaptive routing in accordance with the present invention. Other routers, not shown, that do not employ the adaptive routing in accordance with the present invention may exist in the network 100. Each of the routers 102–107 is connected to at least one other router in the network 100. The packet network 100 employs a standard protocol to determine and disseminate information regarding the connectivity of the links and routers within the network 100, including information about link capacity and available bandwidth, for example. For the preferred embodiment of the present invention, this protocol for dispersion of link and router connectivity information (herein referred to as "network topology information") may be provided from the corresponding function of the Open Shortest Path First (OSPF) protocol.

For the packet network 100, each router maintains a database of network topology information. Consequently, each router knows 1) the existence of each other router in the network; 2) the connections between each router in the network, and 3) the identities of routers that interface to other packet networks "outside" of the packet network 100. In the present context, "outside" may refer to packet networks $N_1$, $N_2$, and $N_3$ not supporting adaptive routing and/or part of a different service provider's network.

The Open Shortest Path First (OSPF) protocol commonly employed in IP networks includes a Shortest Path First (SPF) routing method for the path-selection process. For the preferred embodiments of the present invention, routers of network 100 employing adaptive routing in accordance with the present invention determine logical paths based on a multicommodity flow (MCF) routing method. The MCF routing method may employ information generated by SPF routing method of the OSPF protocol as initial provisioning values, and for provisioning values for non-real-time packet flows and for real-time, non-multiplexable packet flows. In addition, the routers connected in network 100 that do not employ adaptive routing in accordance with the present invention preferably employ a path-selection process based on the SPF routing method.

The MCF routing method accounts for the QoS provisioning assigned to source-destination pairs when routing packet flows. Packet flows may be comprised of several different sets of traffic for different users within a VPN. Before a link failure, a portion of the link's capacity is allocated to the source-destination pair. However, when the link fails, the different sets of traffic desirably have capacity of other links re-allocated to the sets of traffic. In addition, two possible classes of routing may be supported by adaptive routing: multi-path routing and single-path routing. Multi-path routing occurs when flows of a source-destination pair are split, with different ones of the sets of traffic allocated to different new paths, and hence links, through the network. Single path routing occurs when the entire group of sets of traffic are re-routed over the same new path.

If multipath routing exists in the packet network 100, the multi-path routing may be decomposed into single path routing (i.e., multi-path from a source to N destinations, N an integer greater than 1, may be thought of as routing over N single paths. In addition, mathematical tools, such as Steiner path trees, heuristic bin packing, randomized routing, or shortest path spanning trees, may be employed by the algorithms described herein to reduce computational complexity resulting from decomposition of multi-path to single path routing. Consequently, the exemplary routing methods are described herein for single path routing. The present invention is not so limited, however, and one skilled in the art may extend the exemplary routing methods to multipath routing.

In addition, while the preferred embodiments of the present invention are described employing the OSPF protocol, other similar protocols that determine and disperse network topology information may be employed. Consequently, one skilled in the art may readily adapt the system and methods described herein to other such protocols and/or routing mechanisms. Similarly, while preferred embodiments are described that employ the SPF routing method as a path-selection process, other common routing methods may be employed and the present invention is not so limited.

Referring to FIG. 1, each of the routers 102–107, re-calculate new routing in accordance with similar path-selection processes based on similar QoS provisioning and similar network topology information. Consequently, each router desirably calculates the same routing and path selection for source-destination pairs.

However, under some network conditions, "loop packets" may exist (i.e., packets that repeatedly pass through the same sets of routers, rather than pass from the source to the destination.) Such network conditions may be, for example, when: 1) not all routers in the network employ the same routing protocol and the various routing protocols do not allow routers to be aware of each other; 2) the network topology or provisioning changes, resulting in a temporary mismatch of network topology information between routers; and 3) the network allows packets to be routed toward the source to find a router recognizing the desired source-destination pair. Loop packets may circulate between some network routers several times, causing unnecessary traffic congestion, as the loop packets "search" for a router that knows the complete path between the source and the destination route.

To reduce the number of loop packets that may be formed when the path-selection process is initiated, several techniques may be employed. A packet-hop counter limiting the number of hops (paths between routers) the packet traverses may be employed. New routing may be limited so that packets are only sent toward the destination. Signaling packets may also be employed between routers to identify and delete loop packets. For the exemplary embodiments described below, a method to reduce the number of loop packets such those described above is desirably employed in network 100.

Figure 2:
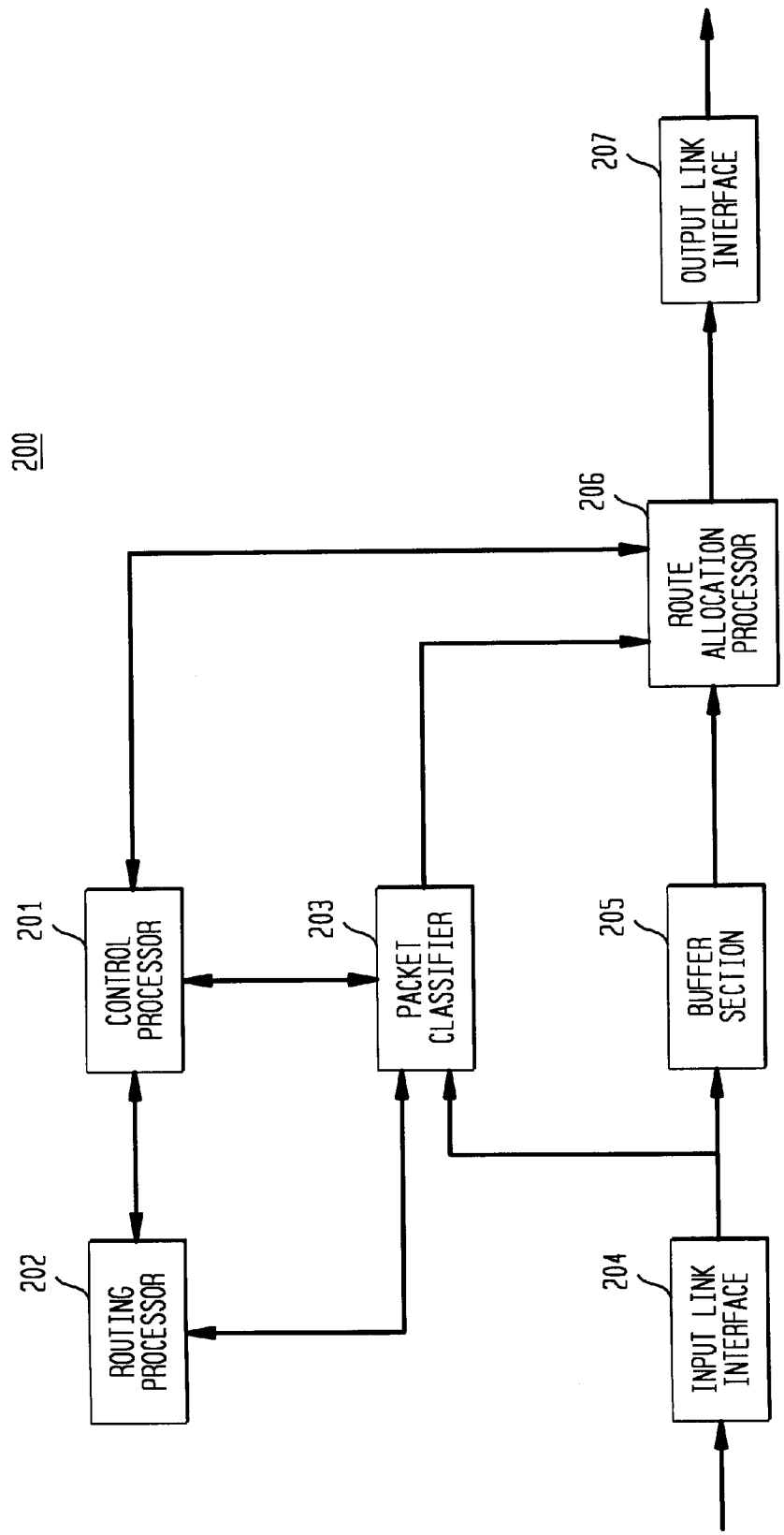
FIG. 2 shows a block diagram of an exemplary processing section of a router implementing adaptive routing in accordance with the present invention.

FIG. 2 shows a block diagram of an exemplary processing section of a router, e.g., router 105, employing alternate path routing in accordance with the present invention. Processing section 200 includes a control processor 201, routing processor 202, packet classifier 203, input link interface 204, buffer section 205, route allocation processor 206 and output link interface 207. An implementation of the processing section and link interfaces of such router may be embodied in, for example, a PacketStar 6400 router, available from Lucent Technologies, Inc. of Murray Hill, N.J.

Packets of one or more packet flows are received at the input link interface 204 by the processing section 200. Input link interface 204 may define one or more input ports, and may comprise the receive sections of one or more line termination cards that terminate at least one transmission line. The termination cards, such as T1, T3 or OC-3 termination cards, support one or more links through the bandwidth of each transmission line. Packets received from the input link interface are queued for processing in buffer section 205, and may be concurrently provided to the packet classifier 203. Buffer section may include buffers allocated to each input port. Packet classifier 203 contains one or more packet filters determining filter rules to be applied to each received packet. Based on the filter rules, route allocation processor 206, which may simply be a cross-bar switch, redirects the packet from the buffer section 205 to one or more corresponding output ports of the output link interface 207. Output link interface 207 may define one or more output ports, and may comprise transmit sections of one or more line termination cards that terminate at least one transmission line.

The control processor 201 (or routing processor 202) may include an element manager (not shown) that periodically reads statistics created from the header information of received packets. As shown in FIG. 2, signals may be exchanged between the packet classifier 203 and control processor 201 to collect or measure traffic statistics and link utilization. Consequently, information pertinent to traffic statistics (average rate r and peak rate P) may be determined, and utilization of incoming and outgoing physical links for source-destination pairs may be measured. The control processor 201 also receives both control messages and control information of data messages. Data messages may be exchanged between source-destination pairs to transport user information. Control messages are messages exchanged between elements or nodes of the network and may be used to establish, maintain or tear down connections. For example, PATH&RESV messages, UPDATE messages and TEAR-DOWN messages of the RSVP protocol may be employed as the control messages. Control messages may also be messages that contain type of service (TOS) bits or TOS addressed metrics, such as is employed in OSPF protocol control messages. Such control messages may include link status and network topology information from other routers.

The output link interface 207 may also include a transmit buffer and a scheduler for scheduling the transmission of packets onto the output port, which may be implemented by a processor on the corresponding line termination card. Various scheduling methods are available for implementing the scheduling function. Scheduling, such as weighted round-robin scheduling, may be employed for enforcing some types of QoS service commitments. A weight may be described as the fraction of the bandwidth for a particular transmit buffer or queue. Thus, weighting may be employed to control resource allocation among VPNs, among services within VPNs, and among source-destination pairs within the service classes. Weights may be calculated by the routing processor 202 and downloaded into the control processor 201 and/or scheduler.

Control processor 201 detects a condition requiring a new adaptive routing calculation in accordance with the present invention, and hence initiates the path selection process to determine the logical paths of source-destination pairs of the network 100. The condition may be termed a "trigger" event, which event is signaled to the routing processor 202. The trigger event may be, for example, a router addition/failure or link connect/disconnect. Control processor 201 may also initiate the path selection process based on a predetermined schedule. The routing processor 202 provides for an adaptive routing calculation, and also possibly new weighting calculations, to determine new routing provisioning entries and weights based on QoS-guarantee provisioning and network topology information stored within the processing section 200. Provisioning entries define logical paths through the network links for different packet flows.

Figure 3:
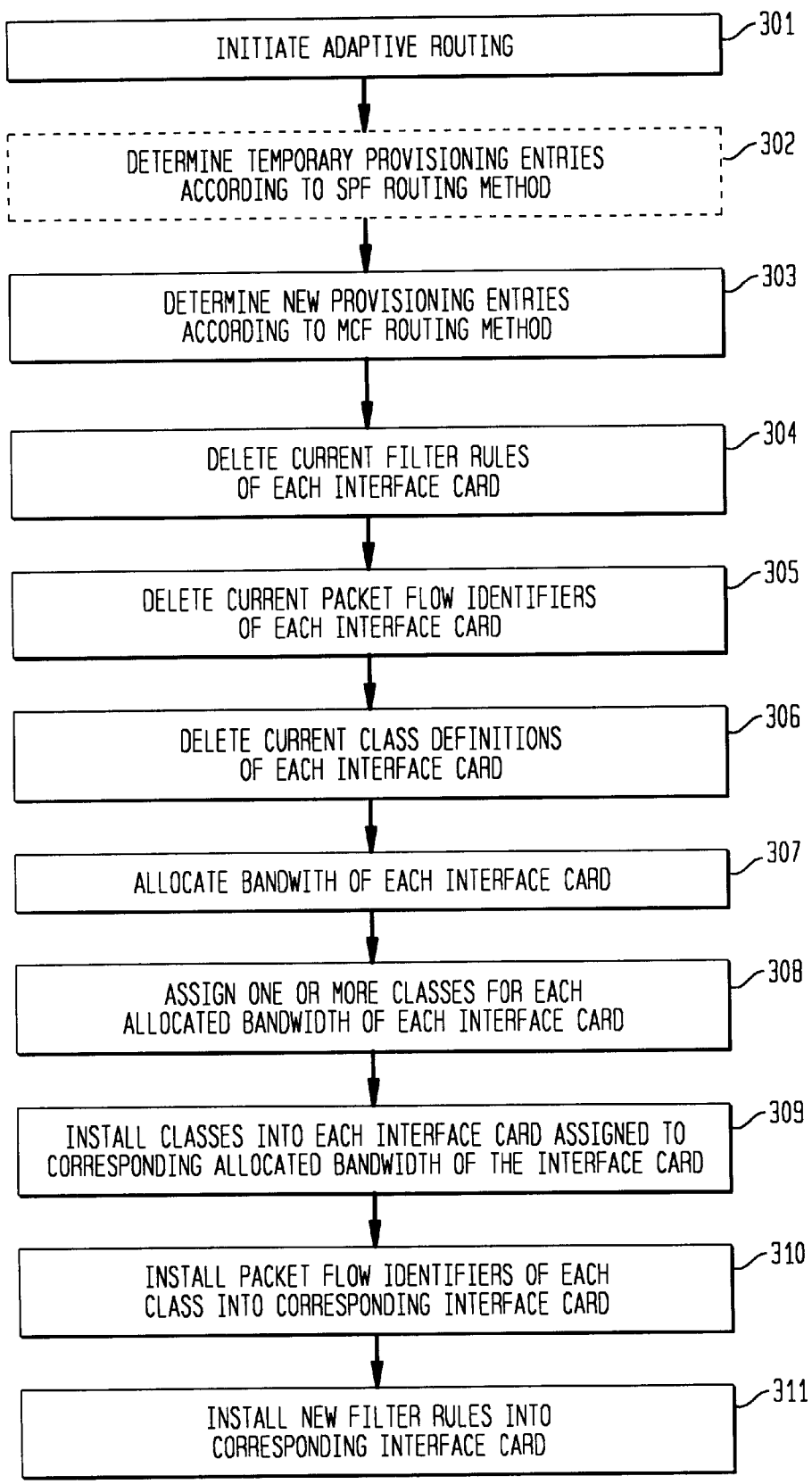
FIG. 3 is an exemplary flowchart for a router implementing adaptive routing in accordance with the present invention when a trigger event is detected.

FIG. 3 is a flow chart illustrating the steps of a router providing adaptive routing in accordance with the present invention based on an exemplary network supporting the OSPF protocol. At step 301, the adaptive routing is initiated by an internal event (such as by a predetermined schedule) or by an external event (such as by a trigger event). The detected event may initiate an optional step 302 in which the path-selection process determines a temporary set of provisioning entries according to the SPF routing method. At step 303, a multicommodity flow (MCF) routing method is employed for a path-selection process to determine new provisioning entries. The MCF routing method may assign some or all of the new provisioning entries based on the temporary set of provisioning entries. New provisioning entries are determined at step 303 based on optimization of the SPF routing calculations according to a predefined metric, such as optimized network revenue W.

For example, at step 302 new routing based on QoS provisioning information and information provided from the provisioning entries of the SPF algorithm may provide an optimized set of provisioning entries for the new routing of classes and packets through network 100. New provisioning entries may group packet flows with a given identifier according to classes, with each class having defined QoS commitments. Bandwidth, or other QoS related commitments as metrics, of a given interface card may be allocated and then different classes assigned to the allocated bandwidth.

At step 304, the current filter rules of each interface, or line termination, card are deleted for the packet filters that are changed or modified. At step 305, the currently defined packet flow identifiers (i.e., a value identifying the specific packet flow, or aggregate of packet flows, that may be based on source and destination addresses) are deleted for each interface, or line termination, card for the packet filters that are changed or modified. At step 306, the current class definitions are deleted for each interface, or line termination, card for the packet filters that are changed or modified. The class definitions of each interface or line termination card specify which packet flow classes may be supported by available bandwidth of the interface card.

At step 307, bandwidth for each interface, or line termination, card is allocated based on, for example, the available bandwidth of each input line interfaces 204 and the available bandwidth of each output line interface 207 (FIG. 2). At step 308, new classes are assigned for the given bandwidth allocations determined in step 307.

At step 309, the new classes generated in step 308 are installed in each corresponding interface, or line termination, card. At step 310 defined packet flow identifiers for the classes are installed for each interface, or line termination, card. At step 311 new filter rules are installed in, for example, the packet classifier 203. The filter rules are employed to route packet flows with corresponding identifiers from input ports to output ports of the router based on the actions associated with the filter rule.

The new routing determined by the path-selection process is provided as provisioning entries of a routing table. The provisioning entries of the table are defined for each packet flow (which may be a packet flow or an aggregate of packet flows specified by source and destination address ranges) and a set of classes, each class defined by a set of QoS provisioning commitments. Each routing table for a packet flow has an associated class. An exemplary routing table for a packet flow based on QoS provisioning and network link topology is given in Table 3.

TABLE 3

| Label | Content |
| --- | --- |
| src_rtr | The identifier of the source router |
| dst_rtr | The identifier of the destination router |
| src_lint | The input logical interface of the source router |
| dst_lint | The output logical interface of the destination router |
| vpn | The identifier for the client (or VPN) that the packet flow belongs to |
| revenue | Assigned revenue value |
| class | Assigned class |
| w2edelay | Maximum end-to-end delay, in microseconds |
| src_addr_low | Lower bound of the source address range for a packet flow |
| src_addr_high | Upper bound of the source address range for a packet flow |
| dst_addr_low | Lower bound of the destination address range for a packet flow |
| dst_addr_high | Upper bound of the destination address range for a packet flow |

As shown in Table 3, the entries src_addr_low and src_addr_high may specify a source address range, and the entries dst_addr_low and dst_addr_high may specify a destination address range. These values may be employed to uniquely identify a packet flow, or aggregate of packet flows. Consequently, these four values may be termed a packet flow identifier (id).

Adaptive routing in accordance with the present invention specifies a class to which the packet flow belongs. This class is associated with a set of QoS commitments that are specified for the class. Table 4 provides an exemplary set of the QoS provisioning commitments for a leaky bucket regulator specified for a class including a packet flow identified by an id value.

TABLE 4

| Label | Type |
| --- | --- |
| r | rate in bytes per unit time |
| b | The sender bucket depth |
| P | Peak rate |
| m | minimum packet size (with overhead) |
| M | maximum packet size (with overhead) |

The new provisioning entries calculated based on the trigger event are provided to the control processor 201, which translates the new routing of source-destination pairs into filter rules. The filter rules are mapped as packet filters downloaded into the packet classifier 203. As would be apparent to one skilled in the art, the processing section of FIG. 2 is exemplary only, and many variations on the processing section may be implemented.

Figure 4:
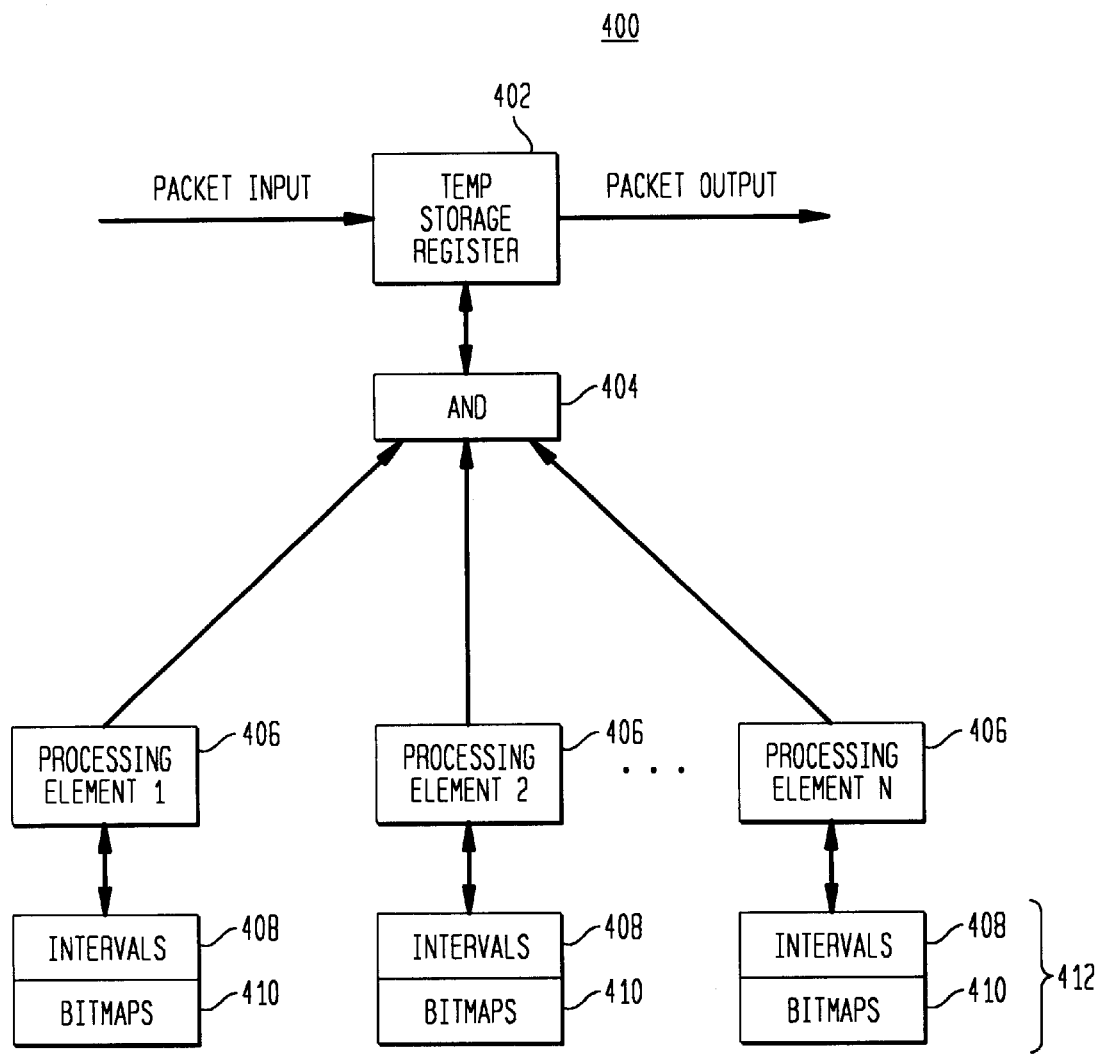
FIG. 4 shows an exemplary implementation of a packet filter of a packet classifier as shown in FIG. 2.

An exemplary hardware implementation of the packet filter 400 of packet classifier 203 is shown in FIG. 4. Packet filter 400 performs simple logic operations since hardware elements may perform only a binary-search operation to locate address ranges (intervals) of filter rules including the value of the corresponding address fields of a packet. Packet filter 400 includes a temporary storage register 402, an AND-operator 404, processing elements 406, and a memory 412 having interval data registers 408 storing one or more corresponding bitmaps 410 associated with each processing element 406. Bitmaps 410 associated with each processing element 406 each identify the corresponding filter-rules associated with the intervals.

As shown in FIG. 4, a packet received by a router is stored in temporary storage register 402, which may be a buffer or register position in a queue. Memory 412 stores interval data and corresponding bitmaps derived from filter rules, for example. Processing elements 406 each perform a binary search of the corresponding derived intervals for the packet fields. One implementation may employ one processing element 406 for each filter-rule dimension (address field) comprising a comparator, a state machine and two local registers. For this implementation, the binary search for all stored intervals 408 by processing elements 406 is performed in parallel.

Each processing element 406 returns a bitmap corresponding to an interval including an address field of the received packet. The returned bitmaps are combined by the AND-operator 404 to form a memory pointer. The result of this search process is a memory pointer to the "best-match" filter rule. The packet filter then performs a further access to memory 412 to retrieve actions associated with the identified filter rule or filter-rule set (not shown). The packet and corresponding retrieved actions are provided to the route allocation processor 206. In exemplary implementations, a packet filter may test for between 512 and 800 filter rules.

Figure 5:
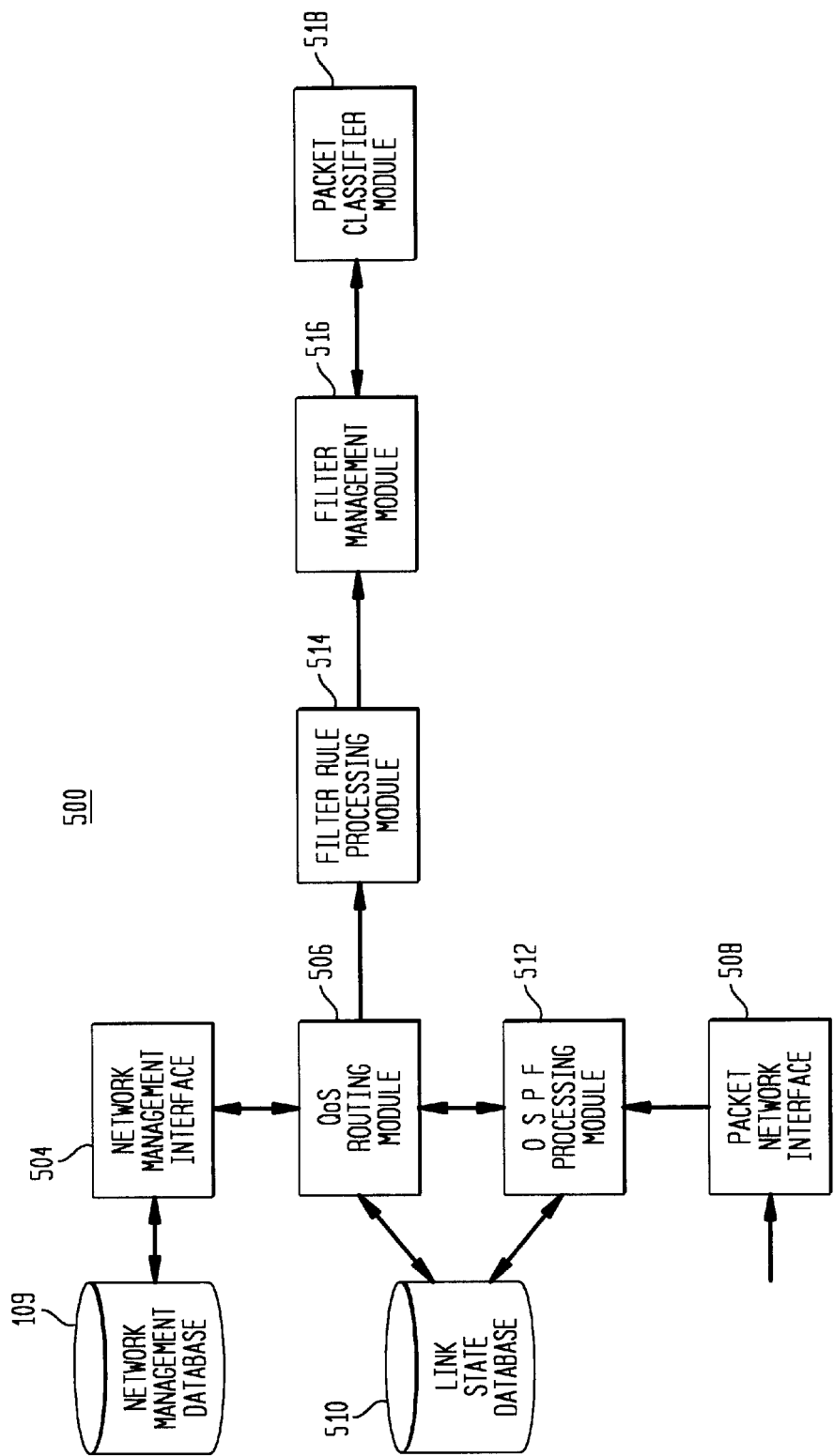
FIG. 5 shows a block diagram of an exemplary distributed processing and database (DPD) system as may be employed with the present invention.

FIG. 5 shows a block diagram of an exemplary distributed processing and database (DPD) system 500 for alternate path routing in accordance with the present invention. DPD system 500 includes an OSPF processing module 512 with corresponding link state database 510, QoS routing module 506, filter rule processing module 514, filter management processing module 516, and packet classifier module 518.

OSPF processing module 512 receives network topology information through the packet network interface in accordance with the OSPF protocol. Network topology information may typically include, for each router in the packet network 100, a router identification address, identification for links connected to the router, other router addresses of other routers connected to the router, and information of other networks (e.g., $N_1$, $N_2$, and $N_3$ of FIG. 1) that may be connected to the router. OSPF processing module 512 stores the network topology information in the link state database 510, and updates the information of the link state database 510 as new network topology information becomes available, such as when the network topology changes. The OSPF processing module further calculates routing information for the packet network in accordance with the SPF routing method known in the art.

QoS routing module 506 receives tables having QoS provisioning information for source-destination pairs. The tables are received from the network management database 107 through network management interface 504. The QoS routing module 506 may also receive both the temporary provisioning entries of the OSPF routing method and the network topology information from the link state database 510. Given the QoS provisioning requirements for source-destination pairs, the QoS routing module 506 re-calculates optimized routing of source-destination pairs through the network with the network topology information of the link state database 510. The QoS routing module 506 re-calculates the optimized routing in accordance with the MCF routing method.

Returning to FIG. 5, the DPD system 500 includes network management interface 504 that retrieves formats data of the network management database 109. Communication between network management interface 504 and network management database 109 may be mediated by a protocol such as Simple Network Management Protocol (SNMP). Data of the network management database 109 may be formatted into a record structure of provisioning tables with, for example, reduced entries and in a format that may be desirable for the QoS Routing module 506. The packet network interface 508 formats data received from control packets of the network into a format desirable for the OSPF processing module 512.

The processing modules, database and interfaces of the DPD system 500 may be implemented in the processing section 200 of FIG. 2. For example, the network management interface 504, QoS routing module 506 and OSPF routing module 512 with link state database 510 may be implemented as software of the routing processor 202. The packet network interface 508, filter rule processing module 514 and filter management processing module 516 may be implemented as software of the control processor 201. The packet classifier module 518 may be implemented as hardware of the packet classifier 203.

Several methods may be employed to provide shared use by the QoS routing module 506 and OSPF processing module 512 of the OSPF routing information and the topology information from the link state database 510. First, the QoS routing module 506 may receive and flatten the OSPF topology information from the link state database 510 into a separately stored database for use by the QoS routing module 506. Second, the QoS routing module 506 and OSPF processing module 512 may share a synchronized database access routine. Third, OSPF processing module 512 may be modified to recognize and employ network topology information from the link state database 510 stored in a manner consistent with the QoS routing module 506. Fourth, when the OSPF processing module 512 changes topology information from the link state database 510, the QoS routing module 506 may be notified and change its data structure in the same manner.

Since the QoS routing module 506 calculates routing and path selection with QoS provisioning information, the QoS routing module 506 may require additional network topology information than that currently collected in accordance with the OSPF protocol. For this case, the control packets as currently employed by the OSPF protocol may be modified to allow for collection of additional features of network topology information. The payload of the OSPF protocol control packets includes a field defined for type of service (TOS) dependent, or addressed, metrics. This field includes several TOS-addressed metrics. The TOS-addressed metrics identify TOS entries in a database or table, with each entry available for use with a TOS metric. Each TOS metric may be a form of control message available to the OSPF protocol. Not all addresses of the database or table of TOS entries of the protocol, however, are currently used for a TOS metric.

For an embodiment of the present invention collecting additional network topology information, the control packets of the OSPF protocol may be modified to define unused TOS entries for adaptive routing. For example, the empty or undefined entries of the TOS-addressed metrics in OSPF packets may be defined to include information such as available link bandwidth (unassigned or assigned but not in use). FIG. 6 shows a line format of an OSPF packet showing the positions of packet type 601 and TOS bits 602, respectively. Consequently, a preferred embodiment of the present invention employs one or more of the TOS entries to convey available bandwidth information on a link (e.g., lowest and highest). In addition, one or more fields of the TOS metrics may be employed to convey information related to available capacity of a link.

Further, one or more TOS entries may be employed to convey information related to routing protocol used in forwarding by a router of network 100. For example, the TOS bits may be defined to identify the type of routing available from the router generating the packet, such as adaptive routing in accordance with the present invention, the SPF routing method, or some other form of routing method for the path-selection process. For example, packets arriving at network 100 may have the defined TOS bits set to specify an unknown or default state. When a router employing adaptive routing in accordance with the present invention receives such a packet, the defined TOS bits are set to indicate a first state.

A router receiving such packet with TOS bits set to the first state and employing adaptive routing (or knows the next logical path for the packet) forwards the packet without changing the values of the TOS bits. A router receiving such packet with TOS bits set to the first state that does not employ adaptive routing (or does not know the next logical path for the packet) changes the TOS bits to a second state and forwards the packet. A router receiving such packet with TOS bits set to the second state forwards the packet in accordance with, for example, a path selected by a default method for the path-selection process (i.e., the SPF routing method).

In addition, preferred embodiments of the present invention may employ a signaling packet conforming to the OSPF protocol. The signaling packet allows a particular router to signal other routers in network 100 that the particular router supports adaptive routing in accordance with the present invention. Such packet may indicate both a version or manufacturer, for example, and may be termed a QoS advertisement packet. The QoS advertisement packet allows routers employing adaptive routing in accordance with the present invention to predict what routing calculation and path selection may be determined by the particular router associated with the QoS advertisement packet. FIG. 7 shows a line format of an exemplary advertisement packet including advertising router information 701. The advertising router information 701 may include information related to the path-selection process and the routing protocol employed by the router originating the advertisement packet.

Some embodiments of the present invention may include a method of ensuring that all routers of the network 100 determine the same sets of provisioning entries by using similar network topology information. Such method may be required when, for example, a router is added to the network, or if some other event causes the network topology information to change. When such a change occurs, the routers of the network may not each contain the same network topology information in link state database 510.

The mismatch between the link state database 510 of each of the various routers of network 100 may require a distributed database commit operation to synchronize the information of the databases. A distributed database commit operation provides signaling between elements of a distributed database to ensure that all elements are modified according to the most recent network topology information. A distributed database commit operation may be employed when relatively frequent updates of a database occur (e.g., when there is high likelihood of network failure, elements or routers are added to the network, or considerably high provisioning activity from a centralized point of command). For the present invention, such distributed database commit operation may require an exchange of packets between routers of the network 100 to verify that each router has determined the same provisioning entries.

As shown in FIG. 7, the exemplary advertisement packet may be employed for the distributed database commit operation as a means for broadcasting path-selection and other routing information determined by particular routers, which in turn reflects a state of the topology information in each link state database. The advertising router information 701 that may be employed to predict what routing calculation and path selection may be determined by the particular router associated with the QoS advertisement packet. The QoS advertisement packet may also include the provisioning entry information for running and candidate sets of provisioning entries 705 and 706. The provisioning entry information may be included in a HASH table format. In addition, a working set of provisioning entries 707 may also be included, the working set being used to signal to other router the provisioning entries that may be modified by network re-configuration commands.

Returning to FIG. 5, once the previously described information is available, the QoS routing module 406 classifies existing packet flows through the packet network 100 into real-time (requiring immediate throughput) and non-real-time (can tolerate delay) packet flows, which classification may be based on a delay threshold. End-to-end delays are calculated and divided into per-hop delays (delay through the link between routers). Real-time and non-real-time packet flows have effective bandwidth requirements assigned for each packet flow, and the packet flows are then further classified into multiplexable or non-multiplexable flows, depending on whether the packet flow occupies more than a predetermined level of bandwidth of the link traversed.

The total available capacity C is allocated to the multiplexable or non-multiplexable flows.

Then, routing calculations and path selections are determined for the multiplexable or non-multiplexable flows based on a corresponding routing mechanism. For example, the multiplexable flows may have path selection based on a multicommodity flow (MCF), or QoS-based, routing method, such as TALISMAN, available from Lucent Technologies, Murray Hill, N.J. The non-multiplexable flows may have path selection based on a lossless effective bandwidth algorithm, such as the SPF routing method.

Adaptive routing in accordance with the present invention receives QoS information and network topology information mediated by the OSPF protocol to calculate the new routing tables. The calculation of new routing tables preferably completes within a time that enables existing packet flows to be re-routed before tear-down of established connections in accordance with a high-level protocol. To this end, some tables for re-routing may be pre-computed prior to use.

Figure 8:
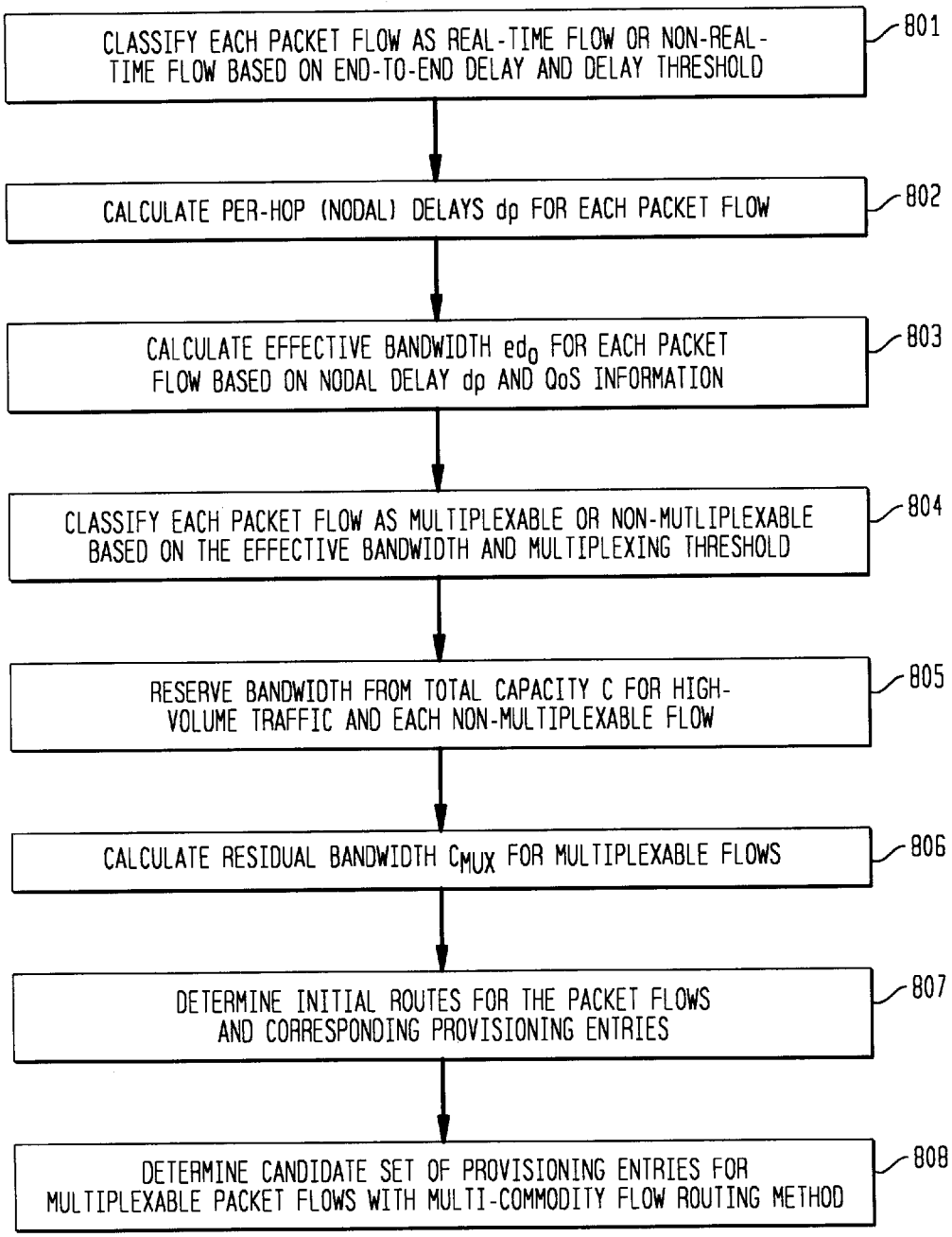
FIG. 8 shows a flowchart of a path-selection process that may be employed by the QoS routing module of FIG. 4.

QoS routing module 406 may employ a method for allocating resources and determining provisioning entries as shown in FIG. 8. First, at step 801, each packet flow is classified as a real-time flow or non-real-time flow based on the end-to-end delay of the packet flow compared to a predetermined delay threshold. Next, at step 802 per-hop, or nodal, delays $d_p$ are calculated for each packet flow (e.g., delay between routers). Per-hop delays $d_p$ are calculated by dividing the end-to-end delay for the packet flow by the maximum number of hops $n_{MAX}$ for the packet flow. For real-time flows, $n_{MAX}$ is one plus the minimum number of hops $n_{MIN}$. For non-real-time flows, $n_{MAX}$ is a laxity factor plus the minimum number of hops $n_{MIN}$.

Once the per hop delays are calculated, at step 803 the effective bandwidth value $ed_o$ of each packet flow is determined using the nodal delays $d_p$ and QoS information. For example, QoS information may be specified for a class the packet flow belongs to, and may include average token (packet) rate r, peak rate P, and the buffer size $B_{token}$ if a leaky bucket regulator is employed by the node. For example, if a node has a buffer size $B_{node}$ and output link capacity $C_{trans}$, the effective bandwidth value $ed_o$ of each packet flow may be calculated as in equation (1):

$$ed_o = \frac{P}{1 + \frac{T_{buf}}{T_{on}}}, \quad \text{if } T_{buf} \leq T_{off} \qquad (1)$$

$$ed_o = r, \quad \text{if } T_{off} \leq T_{buf}$$

where $T_{buf}=(B_{node}/C_{trans})$ (the maximum delay time of the node's buffer), $T_{off}=(B_{token}/r)$, and $T_{on}=(B_{token}/(P-r))$.

At step 804 the packet flows are then classified as multiplexable (packet flows that may be mixed with other flow traffic on one or more links) or non-multiplexable (packet flows that are desirably assigned a dedicated link and dedicated capacity) based on comparison of the corresponding effective bandwidth $ed_o$ values with a multiplexing threshold. The multiplexing threshold may be calculated by, for example, an examination of the statistical properties of the network traffic flows at peak levels.

At step 805 bandwidth is reserved from the total available capacity C for routing of packet flows exhibiting characteristics of high-volume traffic and non-multiplexable flows. High-volume traffic may be defined based on the maximum bandwidth (or peak rate P) of the packet flows. For these high-volume traffic and non-multiplexable packet flows, provisioning entries determined by the shortest-path routing of OSPF may be employed for routing of the packets through the node.

At step 806 the residual bandwidth $C_{MUX}$ for multiplexable packet flows is determined. The residual bandwidth $C_{MUX}$ may be determined as the available capacity C minus the sum of the effective bandwidth values $ed_o$ of the non-multiplexable packet flows. Alternatively, the residual bandwidth $C_{MUX}$ may be determined as the total available capacity C minus the capacity reserved for non-multiplexable packet flows.

At step 807, an initial route is determined for each multiplexable packet flow based on requirement of the effective bandwidth value $ed_o$, which requirement is determined by mapping the effective bandwidth value $ed_o$ to allowed rates of the output links of the node. The initial routes may also be determined, for example, with the SPF routing method.

At 808, routing for the multiplexable packet flows is calculated with a multicommodity flow (MCF) routing method. The routing is provided as a table having a candidate set of provisioning entries.

The method as shown in FIG. 8 employs the QoS provisioning information, the link state topology, and the packet flow classifications (real-time/non-real-time and multiplexable/non-multiplexable packet flows) to form provisioning entries for routing of packets through the node (router). Such provisioning entries may define specific source and source port address ranges of packets to be routed to other specific destination and destination port address ranges. Further, the packet network 100 may employ a protocol, such as the Type of Service (TOS) bits and/or RSVP control messages, to allocate resource reservation over physical and logical links for the corresponding packet flows.

The path-selection process of QoS routing module 506 provides an optimized routing of source-destination pairs to the filter rule processing module 514 as a table having set of candidate provisioning entries. The set of candidate provisioning entries may be employed as information from which filter rules are derived. In accordance with the present invention, the actions of the filter rule are defined so as to route packets through a routing fabric of the router based on the newly determined path selection. Given the source and destination address ranges (and possibly the protocol identifier and TOS specification) of a selected filter rule applicable to a received packet, the corresponding action associated with the filter rule is applied to the packet. The action associated with a filter rule may be to route the received packet of the packet flow having header field values included in the corresponding source and destination address ranges from specific input ports to specific output ports of the router.

Each filter rule comprises a classifier specification and an action. The classifier specification defines ranges of source addresses, destination addresses, source port ranges, and destination port ranges, and may be the packet flow identifier (id) as described previously. A protocol identifier and TOS specification may also be associated with the filter rule. Consequently, the filter rules are preferably constructed as rectangles in a four, five or six dimensional space (i.e, a k-dimensional space, k an integer greater than one corresponding to the number of unique fields used for packet routing). As would be apparent to one skilled in the art, higher dimensional spaces may be employed as the packet filter processes more packet header field values. The filter-rule rectangles may overlap. The particular filter rule that is applied to an incoming packet when the filter-rule rectangles overlap may be determined from a priority assigned to each filter rule.

When a packet arrives, the determination of which filter rule to apply to the packet is a point location problem in the k-dimensional space. The packet classifier solves the point location problem, as described subsequently, and the actions associated with a particular filter rule are retrieved from memory. An exemplary set of provisioning entries for a filter rule may be as given in Table 5.

TABLE 5

| Label | Type |
|---|---|
| id | The index of source-destination pairs for the packet flow (note that when ranges are specified, the packet flow may be an aggregate of packet flows) |
| rtr | The next-hop router that is employed for packet forwarding |
| src_port | The input port of the logical interface of the router |
| dst_port | The output port of the logical interface of the router |
| bw | The amount of bandwidth reserved for the packet flow |
| b | The size of the local buffer for the packet flow |

Table 5 includes the id field that is the packet flow identifier, and is associated with the routing actions of the table. The entries of Table 5 may define actions such as cross-connection between logical port interfaces of the router for a given packet flow. In addition, the QoS commitment for the packet flow, such as required bandwidth and buffer size is specified. The id field value of Table 5 identifies specific source and destination address ranges, as shown in Table 6.

TABLE 6

| Label | Type |
| --- | --- |
| src_addr_low | Lower bound of the source address range for a packet flow |
| src_addr_high | Upper bound of the source address range for a packet flow |
| dst_addr_low | Lower bound of the destination address range for a packet flow |
| dst_addr_high | Upper bound of the destination address range for a packet flow |

The fields of Table 6 may further include the TOS specification and/or protocol identifier.

Filter rule processing module 514 of FIG. 5 creates the new filter rules based on these new provisioning entries. The new set of provisioning entries and corresponding filter rules are then provided to the filter management module 516, which also retains copies of running filter rules corresponding to the currently used, or "running" set of provisioning entries employed by the packet classifier module 518. A running set of provisioning entries, and corresponding running set of filter rules, are generated by the determined path selections prior to reconfiguration and routing re-calculation.

The filter management module 516 compares the new and running sets of filter rules, and selectively determines filter-rules to be deleted from the packet classifier module and filter rules that are to be modified. Once the selected filter-rules to be deleted or modified are determined, the filter management module 516 substitutes the selected packet filter rules into the packet classifier module 518. For the exemplary embodiment, the packet classifier module 518 may be employed by the packet classifier 203 (FIG. 2) to cause specific routing of packet s within the routing fabric, such as by providing control signals provided to the route allocation processor 206.

Figure 9:
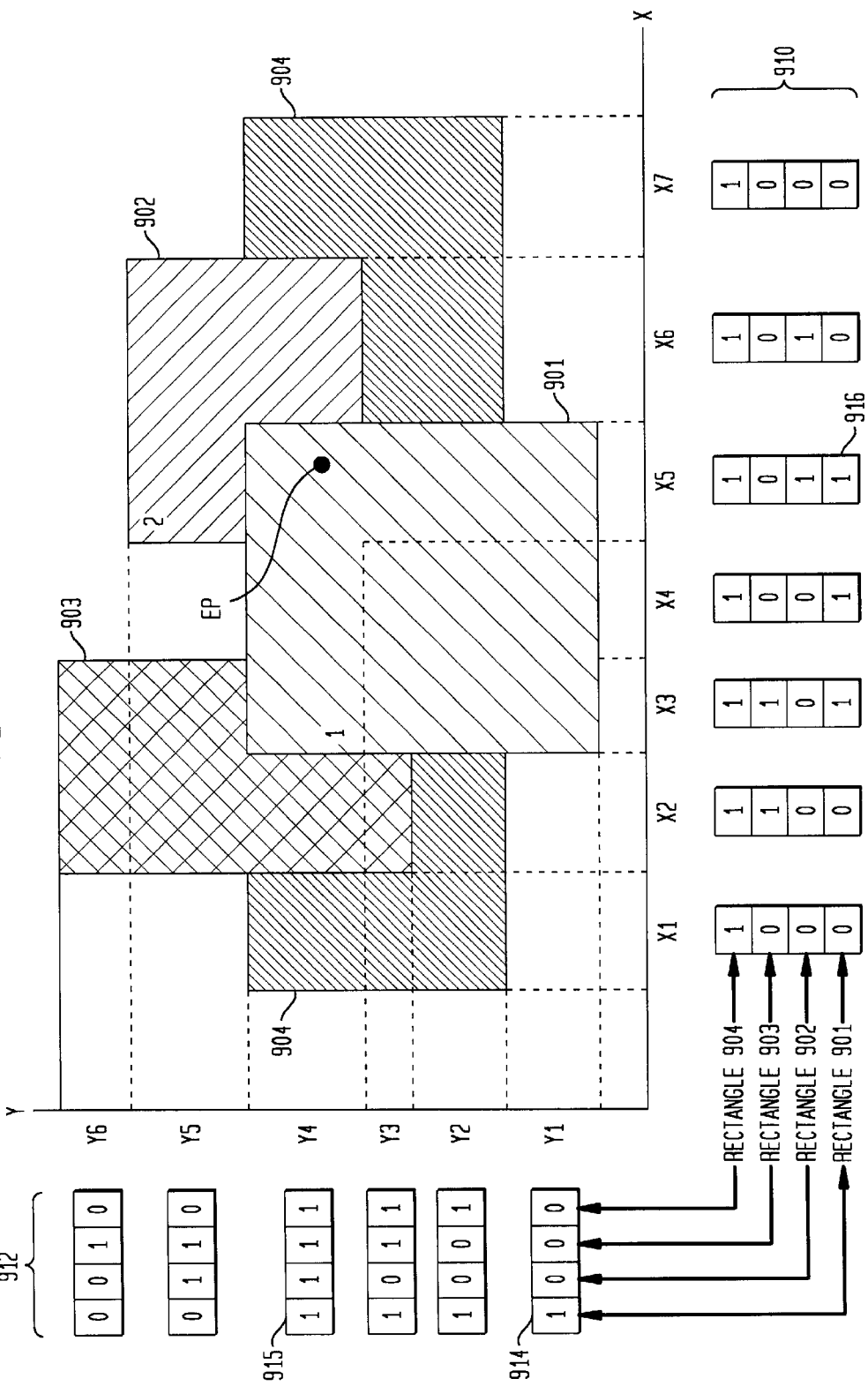
FIG. 9 shows an illustration of packet filtering for two fields of a packet header corresponding to a point location in 2-dimensions.

As described previously, packet classifier module 518 receives filter rules from the filter management module 514, and applies the filter rules to the incoming packets. FIG. 9 illustrates the process of packet filtering on two packet fields, corresponding to a point location in 2-dimensions. A point location in 2-dimensions may be a location of a point within a particular filter-rule rectangle defined by source and destination address ranges. As would be apparent to one skilled in the art, the 2-dimensional point location maybe extended to higher dimensions, such as the 4-dimensional point location, with filter-rule rectangles further defined by source port address ranges and destination port ranges. As show n in FIG. 9, four overlapping filter rules operating on, for example, the source address field and the destination address field of a received packet are represented by overlapping 2-dimensional rectangles 901–904. The filter rule segments of the rectangles 901–904 are projected as intervals labeled X0–X8 and Y0–Y7 on the corresponding dimension axes X (for source address) and Y (for destination address). The intervals and bitmaps may be defined similarly to those described with respect to FIG. 4.

In the example shown in FIG. 9, segments of the four filter rules in each dimension overlap the six intervals on the Y-axis and seven intervals on the X-axis, respectively. For a worst case, the projection results in a maximum of 2n−1 intervals on each axis for the dimension, where n is the number of filter rules. For the example, n is four filter rules, resulting in the worst case of seven intervals on the X-axis. Bitmap arrays 910 and 912 associated with each dimension are formed having bitmaps for each interval. A bit in the bitmap is set if, and only if, the rectangle corresponding to the bit position overlaps with the interval that the bitmap corresponds to. For example, interval Y1 has a corresponding bitmap 914. Since rectangle 901 overlaps interval Y1, the bit at the first bit-position is set to logic "1". None of the rectangles 901–904 may overlap with, for example, only half an interval because of the method by which the intervals are defined. The bitmaps may be stored as one or more bitmaps having associated interval bitmap pointers.

A packet arrives to the packet filter of the router. The packet may have several fields, but two field values, $E_1$ and $E_2$, one per dimension, form coordinates of a point EP for point-location in 2-dimensions. $E_1$ may be a source address, and $E_2$ may be a destination address. Intervals are located on each dimension axis X and Y that include the corresponding field values of the point EP. In the example, these are intervals X5 and Y4 for the X-axis and Y-axis, respectively. The interval bitmaps 916 and 915 of intervals X5 and Y4, respectively, are employed to locate the highest priority rectangle that covers this point. The interval bitmaps 916 and 915 may be reconstructed from a retrieved bitmap and corresponding interval bitmap pointers. Rectangles 901–904 may be numbered and allocated bit-positions in the interval bitmap based on their priorities, with rectangle 901, for example, being the lowest priority and rectangle 904 being the highest priority. After the combination of the interval bitmaps in step 904, the first bit set to logic "1" in the resulting filter-rule bitmap is the bit identifying the highest priority rectangle 904 amongst all those rectangles overlapping the point EP in the example shown in FIG. 9.

For the preferred embodiments of the present invention, the QoS routing module 506 employs a MCF routing method. However, the MCF routing method is derived from general routing optimization, and may be preferred if new, optimized routing is desirably determined in real time. The following describes the general routing optimization method, and then the MCF routing algorithm. The general routing optimization method includes methods based on both stochastic and deterministic routing optimizations. The general routing optimization method and the MCF routing algorithm are similar to those methods employed in network design tools. Such network design tools employ, for example, the method described in D. Mitra et al., "ATM Network Design and Optimization: A Multirate Loss Network Framework," *IEEE/ACM Transactions on Networking* 4 (August 1996) 531–543 (herein referred to as "Mitra et al."). The stochastic routing optimization and MCF routing methods of Mitra et al. may be employed with virtual private network design tools, such as TALISMAN available from Lucent Technologies, of Murray Hill, N.J. The present invention is not so limited to the following method, and any routing method may be employed which calculates optimized routing paths through packet network 100 based on QoS provisioning information and network topology information.

The general routing optimization method determines rates of traffic offered to each route between a source-destination pair that optimize performance (also known in the art as the optimum routing problem) of the network 100 according to predefined optimization criteria that includes QoS provisioning information. The performance of the network may be characterized in various ways. For example, performance is desirably characterized by the value of the long-term network revenue W. Long-term network revenue W may be defined as the weighted measure of carried bandwidth on the network constrained such that each source-destination pair earns a minimum amount of revenue. Revenue W is determined by the revenue earned per carried connection per unit time $e_{sr}$ and the traffic rate (also referred to as "traffic intensity").

The subscript s (s an integer greater than 0) represents each service type, and signifies that each service type has its own particular set of values for these parameters. In the art of network design and management, the traffic characteristics and measures of quality of service may be determined by the pertinent "application," and the term "service" is used somewhat more narrowly. For the following, the term "service" is employed in a general sense, in which it includes or is synonymous with the term "application". A class, or possibly a super-class, may be a service. The subscript r (r an integer greater than 0) represents each route in the set of permissible routes between a given source-destination pair, and signifies that even within a given service type s, each route has its own particular set of values.

Figure 10:
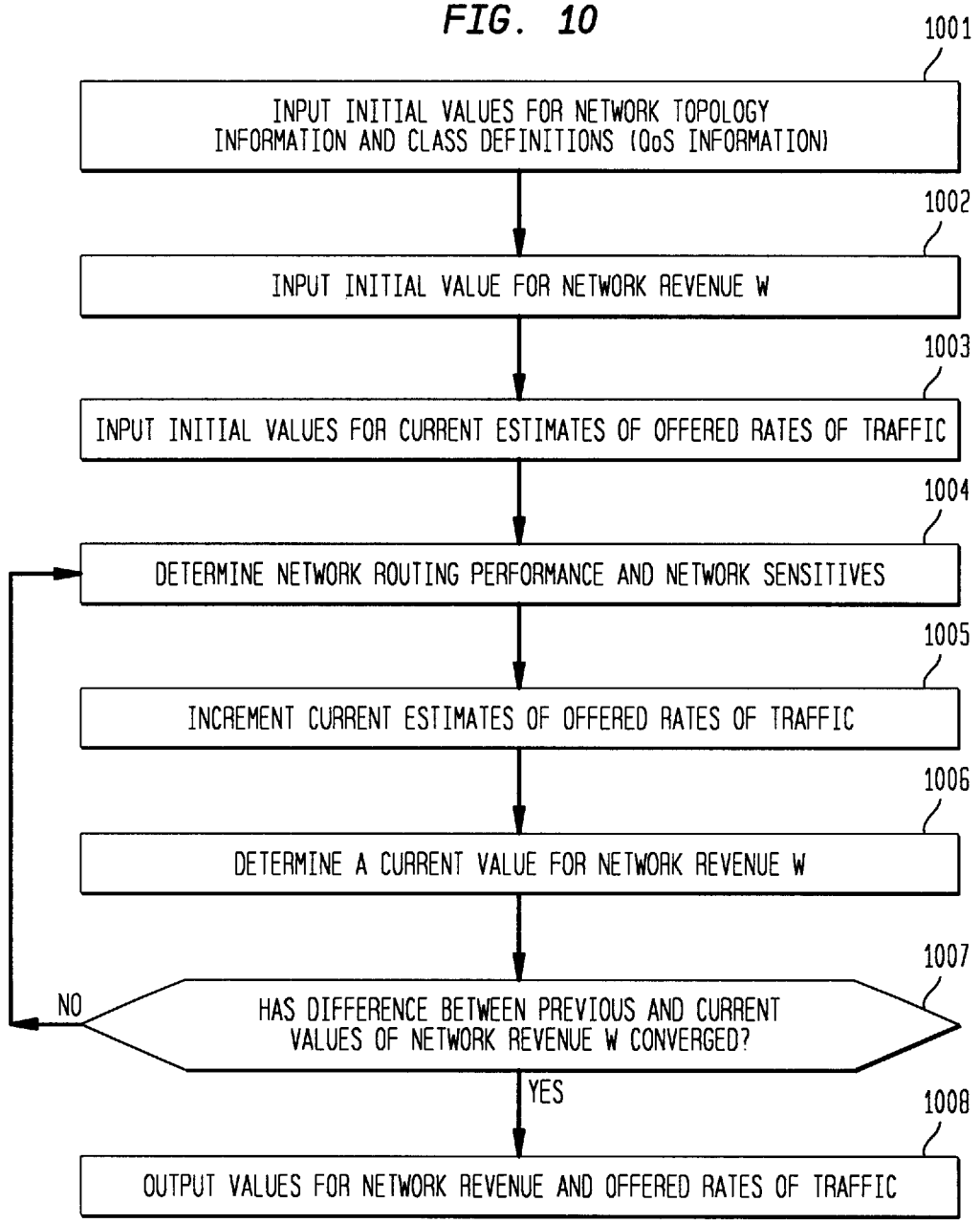
FIG. 10 shows an exemplary flowchart for the general routing optimization as may be employed by the present invention.

Given these definitions, a general routing optimization may be formulated as joint maximization of network revenue by considering all offered traffic to the network. FIG. 10 illustrates an exemplary flowchart for the general routing optimization. At step 1001, initial values are provided to define the network topology and network traffic characteristics. Initial values include stream, or packet flow, identifiers, bandwidth, and port definitions for each node n of the set of nodes N, $1 \leq n \leq N$ and each link l of the set of links L, $1 \leq l \leq L$. Initial values also include predefinitions (e.g., QoS provisioning commitments) for each service class s of the set of services S, $1 \leq s \leq S$, the effective bandwidth $ed_{sl}$ of each service class s on each link l, the demand for each service class between each source-destination pair σ, the route sets R(s, σ), for packet flows (s, σ), and the capacity allocation $C_l$ on the respective link l. Note that these initial values may be defined or determined as described with respect to FIG. 8.

At step 1002, an initial value for the network revenue W is provided. The value for W may be predetermined through network simulations, heuristic methods, or previous or current values measured prior to network reconfiguration and/or re-routing calculation.

At step 1003, initial values are provided as current estimates for the traffic rates, The initial values for the traffic rates may be predetermined through network simulations, heuristic methods, or previous or current values measured prior to network reconfiguration and/or re-routing calculation.

At step 1004, network performance of routing is determined from the current estimates for the traffic rates, the initial value for the network revenue W, and the initial values for the parameters provided in step 1001.

At step 1005, the values of the current estimates for the traffic rates are incremented according to, e.g., the method of steepest ascent. At step 1006, a current value of W is calculated.

At step 1007, in an exemplary method of measuring the approach to a local optimum, convergence to the optimum value of network revenue W is performed by comparing the difference between current and previous values of W. If the difference is less than a predefined threshold, the iterative procedure may be defined as being converged to an estimate for the optimum value for W. If W is less than the predetermined threshold, at step 1008 the current values of W and the current estimates for the traffic rates are provided as the optimum output values. The predefined threshold may be determined off-line through network simulation or other methods known in the art. Otherwise, the procedure is iterated, by returning to step 1004, using the current estimates for the traffic rates as input values.

The MCF routing method is derived from a simplification to the general routing optimization with stochastic variables. Consequently, the general routing optimization with stochastic variables is first described. The general stochastic routing method derived with stochastic variables is as follows. The traffic intensity is defined as the mean arrival rate of connection requests offered (i.e., to be established) to the given route multiplied by the mean holding period of a connection. Arrivals of connection requests may follow a Poisson distribution. Related to the traffic intensity is the offered traffic rate $\rho_{sr}$ to a route r for a service class s. The loss probability is defined as that fraction of connections that are not established, or "blocked", for a given link or route. Blocking occurs if any link in the route refuses to establish the connection due to insufficient resources to carry the connection on that link.

Loss probabilities may exhibit dependence on the offered traffic rates $\rho_{sr}$. Consequently, small changes in traffic loading in one portion of the network may have effects over a larger portion of the network. Loss probabilities may be determined from the relationship between link loss probabilities $B_{sl}$ (probability of loss of service s on a link l) and route loss probabilities $L_{sr}$ (probability of loss of service s on route r). Therefore, an iterative method may be employed to determine an estimate of the optimal set of offered traffic rates $\rho_{sr}$ by successive approximations. Successive approximation may employ an approach based on well-known techniques of optimization, such as the method of steepest ascent. According to this method, knowledge of the sensitivity of network revenue W to each of the various parameters such as rates of traffic offered to the routes (the offered traffic rates $\rho_{sr}$), is used to formulate the next estimate (approximation) for the current estimate (approximation). These sensitivities of network revenue W to each of the various parameters ($\partial W / \partial \rho_{sr}$) are collectively referred to as the "network sensitivities."

An arriving connection request of a given packet flow may be offered to any route in the set of permissible routes for that packet flow. These arriving connection request offers may be approximately distributed over the routes of the route set according to respective, predetermined probability values. That is, for each route, the probability that a randomly selected connection will be offered to that route has a predetermined value. The optimized values of the parameters $\rho_{sr}$ are employed to determine these probability values.

General routing optimization with stochastic variables is now described referring to FIG. 10. At step 1001, the initial values are provided to define the network topology and network traffic characteristics, and, at step 1002, an initial value for the network revenue W is provided. At step 1003, an initial set of values are provided as current estimates for the traffic rates, $\rho_{sr}$.

At step 1004, route loss probabilities $L_{sr}$ and network sensitivities $\partial W / \partial \rho_{sr}$ are determined from the current estimates for the traffic rates $\rho_{sr}$, the initial value for the network revenue W, and the initial values for the parameters provided in step 1001.

At step 1005, the values of the current estimates for the $\rho_{sr}$ are incremented according to, e.g., the method of steepest ascent. At step 1006, a current value of W is calculated as in equation (2).

$$W = \sum_{\sigma,s} \sum_{r \in R(s,\sigma)} e_{sr}\rho_{sr}(1 - L_{sr}) \quad (2)$$

At step 1007, convergence to the optimum value of network revenue W is determined. If the difference is less than a predefined threshold, the iterative procedure may be defined as being converged to an estimate for the optimum value for W. If W is less than the predetermined threshold, at step 1008 the current values of W and the current estimates of $\rho_{sr}$ are provided as the optimum values of W and $\rho_{sr}$. Otherwise, the procedure is iterated, by returning to step 1004, using the current estimates of $\rho_{sr}$ as input values.

At step 1004 of FIG. 10, the performance of the determined routing and network sensitivities are determined by calculating the loss probabilities $L_{sr}$ and the network sensitivities $\partial W/\partial \rho_{sr}$. The network sensitivities may preferably be defined as the respective derivatives of network revenue with respect to the offered load of service type s on route r. The link loss probability $B_{sl}$ of each service type s on each link l may be generated at step 1004 of FIG. 10. Procedures known in the art may be employed to derive, from the link loss probability $B_{sl}$ and other information generated in the iterative procedure, a measure of the desired bandwidth utilization for each link of each service route. The desired bandwidth utilization may then be employed to determine nominal allocations of bandwidth for each packet flow, or packet flow, to each link of each service route. Such procedures are described in, for example, Elwalid et al. and Mitra et al.

Figure 11:
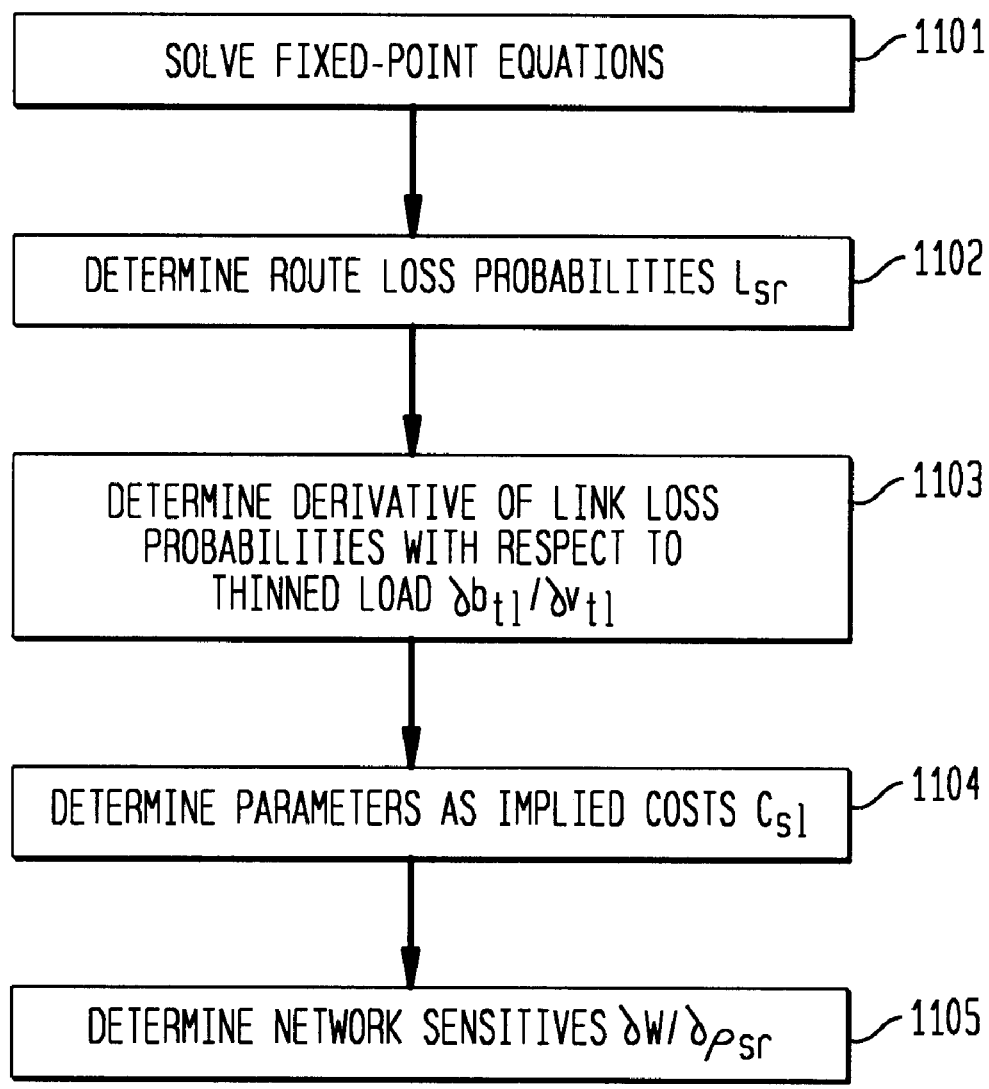
FIG. 11 shows a flowchart for the step of determining route loss probabilities and network sensitivities of the method shown in FIG. 10 with stochastic variables.

The step 1004 of FIG. 10 for general routing optimization with stochastic variables is shown in FIG. 11. The step 1004 of FIG. 11 is shown as a method of five steps, shown respectively as steps 1101, 1102, 1103, 1104, and 1105. At step 1101, a self-consistent solution of two systems of coupled equations (for each service class s and link l) is solved for the predefined effective bandwidths $ed_{sl}$, the predefined link capacities $C_l$, and the current estimates of the offered traffic loads $\rho_{sr}$. The step 1101 may include a determination of the link loss probability $B_{sl}$ of calls of service s on link l. Since each route r carrying traffic of service type s and using link l adds the load $v_{sl;r}$ on link l (which added load may follow a Poisson distribution), the added load may be at a rate that is reduced by independent traffic thinning (i.e., dropping of connections) by all other links in the route. By summing the added loads $v_{sl;r}$ over all routes r which use link l, the total thinned, or reduced, load of service s offered to link l is $v_{sl}$. The reduced load with link independence is given in equation (3):

$$v_{sl} = \sum_{\sigma} \sum_{r \in R(s,\sigma): l \in r} \rho_{sr} \prod_{m \in r-\{l\}} (1 - B_{sm}) \quad (3)$$

In addition, the $B_{sl}$ may be determined from equation (1) and expressed as a mapping $\phi_{sl}$ of the set of total thinned loads per link $v_l = \{v_{sl}\}_s$ for all services s ($1 \leq s \leq S$).

The step 1101 may employ an interative method to solve these coupled equations, referred to as fixed-point equations (FPE). For the set of all routes R(s,σ), one system of equations defines the set of link loss probabilities $B_{sl}$ and is given in equation (4), and the other system defines the set of offered loads $v_{sl}$ and is given in equation (5).

$$B_{sl} = \phi_{sl}(v_l) \quad (1 \leq s \leq S) \quad (4)$$

$$v = \Psi(B) \quad (5)$$

where $v = \{v_{sl}\}_{s;l}$ (for all links l ($1 \leq l \leq L$)), and $B = \{B_{sl}\}$ (for all services s ($1 \leq s \leq S$) and links l ($1 \leq l \leq L$)), and $\Psi$ is the mapping set $\{\phi_{sl}\}_{sl}$ for all services s ($1 \leq s \leq S$) and for all links l ($1 \leq l \leq L$).

At step 1102, the route loss probabilities $L_{sr}$ are determined from the relationship as given in equation (6):

$$L_{sr} = 1 - \prod_{l \in r} (1 - B_{sl}) \quad (6)$$

Step 1103 then determines the derivative of the link loss probability $B_{sl}$ with respect to each of the total thinned loads $v_{sl}$ as given in equation (7):

$$\frac{\partial B_{sl}}{\partial v_{tl}} = (1 - B_{tl})[L_s(ed_l, v_l, C_l - d_{tl}) - L_s(ed_l, v_l, C_l)] \quad (7)$$

where t is a dummy variable index, $ed_l$ is the set of effective bandwidths $\{ed_{sl}\}$ for all services s on link l, $v_l$ is the set of thinned $\{v_{sl}\}$ for all services s on link l, and $C_l$ is the capacity of link l.

At step 1104, a set of parameters $c_{sl}$ is calculated for each service class s and each link l. These parameters, which may be defined as implied costs, reflect the effective loss of revenue occasioned when the carrying of connections of a given service class s on a given link l reduces the remaining capacity and thus leads to an incremental increase in the blocking of future offered calls. The predefined network revenue $e_{sr}$ earned per carried connection per unit time, and the route loss probability $L_{sr}$, which is the equilibrium probability that after admission to the network, a connection of service class s will be dropped by route r (a route will drop a call if any of its links refuses the call) are provided as input values to step 1104. At step 1104, the parameters $c_{sl}$ are determined from the relationship as given in equation (8) (where t is a dummy variable index over s):

$$c_{tl} = \frac{1}{(1 - B_{tl})} \cdot \sum_{\sigma,s} \sum_{r \in R(s,\sigma): l \in r} \frac{\partial B_{sl}}{\partial v_{tl}} v_{sl}; r \left( e_{sr} - \sum_{k \in r-\{l\}} c_{sk} \right) \quad (8)$$

Equation (8) represents a system of (S×L) linear equations that may be solved for the set of parameters $c_{sl}$. The complexity of the calculations required to solve equation (8), using exact techniques, may be $O(S^3 L^3)$ (here $O( )$ is the mathematical term "on the order of").

The calculation of network sensitivities $\partial W/\partial \rho_{sr}$ is performed at step 1105. The network sensitivities $\partial W/\partial \rho_{sr}$ are then readily derived from the route loss probabilities $L_{sr}$, the earnings parameters $e_{sr}$, and the implied costs $c_{sl}$ as shown in equation (9):

$$\partial W / \partial \rho_{sr} = (1 - L_{sr}) \left( e_{sr} - \sum_{l \in r} c_{sl} \right) \quad (9)$$

In many cases of practical importance, the link capacities may become so great that it is not economically or numerically feasible to solve the FPE as given by equation (4) and equation (5) to find the implied costs by exact techniques. If the calculation employs exact techniques, the calculation of the link loss probabilities $B_{sl}$ may have complexity O(C), where C characterizes the link capacities.

In such cases, as described in Mitra et al., an asymptotic approximation referred to as the Uniform Asymptotic Approximation (UAA) method may be used to reduce the complexity of the calculations. In addition, various values for groups of small links may be determined by exact techniques while, concurrently, various values for groups of larger links may be determined by the UAA method. Such an approach may be termed a "hybrid" approach.

When the UAA method is employed, solving the fixed-point equations may require less computational complexity, and hence may require less time to perform the computations. The complexity of calculating the link loss probabilities may be reduced to O(1) (i.e., it remains bounded as C increases without bound), and the complexity of finding the implied costs may be reduced to $O(L^3)$. Thus, the complexity of finding the implied costs is made independent of the number of service classes. This is especially significant for large multirate networks that serve customers with diverse needs and thus carry traffic in many different service classes.

Although the UAA method may be preferred for the stochastic optimization as addressed in Mitra et al., different asymptotic approximation techniques may be employed when solving the stochastic optimization in the context of the present invention, such as the Refined Uniform Asymptotic Approximation (RUAA) method as described in J. A. Morrison, K. G. Ramakrishnan, and D. Mitra, "Refined Asymptotic Approximations to Loss Probabilities and Their Sensitivities in Shared Unbuffered Resources," SIAM J. APPL. MATH. 59 Number 2, November 1998, 494–513. The RUAA method may be preferred as more accurate for calculating implied costs and sensitivities to link loss probabilities.

However, since the present invention relates to adaptive routing in which new network routing is determined in real time, the stochastic optimization of the UAA and RUAA methods may not necessarily provide adequate performance. Consequently, the preferred embodiments of the present invention employ the MCF routing method as derived from a simplification to the general routing optimization with stochastic variables. The simplification removes the characteristics of randomness and stochastic variables from the stochastic system. The connection request arrival and connection holding times are considered as deterministic variables (deterministic traffic rates defined as $x_{sr}$), while the packet flows are considered as static or infinite duration fluids or flows. With this simplification, the optimum routing problem is considered as a linear programming problem (a large system of linear functions of unknowns and linear objective function).

General routing optimization with the MCF routing method is now described referring to FIG. 10. At step 1001, the initial values are provided to define the network topology and network traffic characteristics, and, at step 1002, an initial value is provided for the network revenue W, approximated by maximized deterministic revenue $W_F$ (defined below). At step 1003, an initial set of values are provided as current estimates for the traffic rates, $x_{sr}$. The initial set of values for the traffic rates $x_{sr}$ may be predetermined through network simulations, heuristic methods, or previous or current values measured prior to network reconfiguration and/or re-routing calculation.

At step 1004, the performance of the network routing and network sensitivities are determined from the current estimates for the traffic rates $x_{sr}$, the initial value for the network revenue $W_F$, and the initial values for the parameters provided in step 1001.

At step 1005, the values of the current estimates for the $x_{sr}$ are incremented according to, e.g., full pricing. At step 1006, a current value of $W_F$ is calculated.

At step 1007, in an exemplary method of measuring the approach to a local optimum, convergence to the optimum value of network revenue $W_F$ is performed by comparing the difference between current and previous values of $W_F$. If the difference is less than a predefined threshold, the iterative procedure may be defined as being converged to an estimate for the optimum value for $W_F$. If W is less than the predetermined threshold, at step 1008 the current values of $W_F$ and the current estimates of $x_{sr}$ are provided as the optimum values of $W_F$ and $x_{sr}$. The predefined threshold may be determined off-line through network simulation or other methods known in the art. Otherwise, the procedure is iterated, by returning to step 1004, using the current estimates of $x_{sr}$ as input values.

At step 1004 of FIG. 10, the performance of routing and network sensitivities with respect to maximized revenue $W_F$ are determined by solving the linear programming problem, as given by equation (10) with the constraints of equation (11) and equation (12):

$$\text{Max } W_F = \sum_{\sigma,s} \sum_{r \in R(s,\sigma)} e_{sr} x_{sr} \tag{10}$$

$$\sum_{r \in R(s,\sigma)} x_{sr} \leq \overline{\rho}_{s\sigma} \text{ for all } s \text{ and } \sigma \tag{11}$$

$$\sum_{\sigma,s} \sum_{r \in R(s,\sigma): l \in r} ed_{sl} x_{sr} \leq C_l \text{ for all } l \tag{12}$$

In equation (10), equation (11), and equation (12), the value $x_{sr} > 0$ for all s and r, and $\overline{\rho}_{s\sigma}$ is the average (median or mean) traffic demand. As would be apparent to one skilled in the art, $W \geq W_F$, where $W_F$ is network revenue according to the solution of the linear programming problem, and W is the network revenue as determined from equation (2).

Linear programming techniques are well known in the art, and simplex-based or interior point-based techniques, for example, may be employed for a solution for the present invention. For example, simplex-based techniques are described in David G. Luenberger, Linear and Nonlinear Programming, Addison-Wesley, 1984. Interior point-based techniques are described in N. K. Karmarkar and K. G. Ramakrishnan, Computational results of an interior point algorithm for large scale linear programming, Mathematical Programming 52 (1991) 555–586.

The network sensitivities may preferably be defined as the respective derivatives of network revenue with respect to the offered traffic rates $x_{sr}$ of service type s on route r. Solving the linear programming problem for network performance with respect maximized revenue W also provides the values for the network sensitivities. Procedures known in the art may be employed to derive from the offered traffic rates and network sensitivities a measure of the desired bandwidth utilization for each link of each service route. The desired bandwidth utilization may then be employed to determine nominal allocations of bandwidth for each packet flow, or packet flow, to each link of each service route.

While the exemplary embodiments of the present invention have been described with respect to methods, the present invention is not so limited. As would be apparent to one skilled in the art, various functions may also be implemented in the circuits or a combination of circuits and in digital domain as processing steps in a software program of, for example, a digital signal processor, micro-controller or general purpose computer.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An apparatus for routing packets of a plurality of packet flows in a packet network comprising:
a routing processor adapted to:
1) collect network topology information,
2) collect quality of service (QoS) provisioning information for each one of the plurality of packet flows through one or more routers of the packet network, and
3) determine a network path for each one of the plurality of packet flows using a general routing optimization method based on the QoS provisioning and network topology information, wherein said each one of the plurality of packet flows is further classified as either a real-time flow or a non-real-time flow based on a delay threshold;
a control processor adapted to generate, for a first router, a set of one or more filter rules for the first router based on each network path of one or more packet flows passing through the first router, each filter rule defining a physical path through the first router for corresponding ones of the one or more packet flows passing through the first router;
a packet classifier adapted to apply a selected filter rule to each packet of a corresponding packet flow passing through the first router to cause said each packet to traverse the physical path through the first router in accordance with the selected filter rule, and
wherein the routing processor comprises a QoS routing module adapted to:
1) compute an effective bandwidth of said each one of the plurality of packet flows;
2) classify said each one of the plurality of packet flows as either a multiplexable flow or a non-multiplexable flow based on a comparison of the corresponding effective bandwidth with a bandwidth threshold value;
3) reserve i) a first portion of an available capacity of the first router for each one of the one or more packet flows passing through the first router classified as the non-multiplexable flow and ii) a second portion of the available capacity for said each one of the one or more packet flows classified as the multiplexable flow;
4) determine a set of candidate routes, each candidate route corresponding to said each one of the plurality of packet flows, and at least one candidate route allocated to the second portion of the available capacity;
5) calculate said each network path based on the set of candidate routes; and
6) calculate a nodal delay for said each one of the plurality of packet flows based on the network topology information and its corresponding classification as a real-time flow or a non-real-time flow, and
wherein the QoS routing module determines the set of candidate routes by:
4(i) receiving a present value for network revenue and estimates for offered rates of traffic for each class of the plurality of packet flows, wherein said each class identifies a set of QoS commitments of the QoS provisioning information associated with said each one of the plurality of packet flows assigned to said each class;
4(ii) determining route loss probabilities and network sensitivities for said each class based on the nodal delay and the effective bandwidth of said each one of the plurality of packet flows assigned to said each class, the network topology information, the corresponding present value for network revenue of said each class, and the corresponding estimates for offered rates of traffic of said each class;
4(iii) adjusting the estimates for the offered rates of traffic of said each class;
4(iv) forming a new value for network revenue of said each class;
4(v) comparing the new and present values for network revenue of said each class to determine whether the new value converges; and
4(vi) when the new value of said each class converges, determining the set of candidate routes based on the new value of network revenue and the estimates for the offered rates of traffic of said each class; otherwise, setting the new value of network revenue of said each class as the present value and then repeating 4(ii) through 4(vi).

2. The invention as recited in claim 1, wherein the general routing optimization method is a multicommodity flow (MCF) routing method and the routing processor comprises:
a first routing module adapted to receive, in accordance with a routing protocol, a portion of the network topology information from each of the one or more routers of the packet network into a link state database of the router; and
a second routing module adapted to receiving the QoS provisioning information from a network management database into the link state database.

3. The invention as recited in claim 2, wherein the routing protocol is at least one of a link-state protocol and a protocol allowing for communication of network topology information between the one or more routers of the packet network.

4. The invention as recited in claim 2, wherein the routing protocol is an open shortest path first (OSPF) protocol.

5. The invention as recited in claim 1, wherein the QoS routing module is further adapted to determine one or more of the set of candidate routes for the each of the plurality of packet flows classified as non-multiplexable flows in accordance with a network routing method; and to calculate a corresponding network path for each one of the set of candidate routes for each of the packet flows classified as non-multiplexable flows.

6. The invention as recited in claim 5, wherein the predetermined network routing method is a shortest path first (SPF) method.

7. The invention as recited in claim 1, wherein the first router includes a plurality of interface cards, each one of the plurality of interface cards having a corresponding packet classifier and each one of the plurality of interface cards adapted to interface with a corresponding link of the packet network, wherein:
the control processor is adapted to:
1) delete a set of running filter rules, one or more packet flow identifiers, and said each class from the packet classifier of each one of the plurality of interface cards of the first router, wherein each one of the one or more packet flow identifiers identifies corresponding ones of the one or more packet flows passing through the first router;
2) allocate a portion of bandwidth of each one of the plurality of interface cards of the first router to said each class based on said each network path determined by the routing processor; and 3) install said each class, the one or more packet flow identifiers, and one or more of a set of new filter rules in the packet classifier assigned to a corresponding one of the plurality of interface cards, the one or more-packet flow identifiers and said each class being assigned to each corresponding one of the plurality of interface cards based on the said each network path, wherein the one or more of the set of new filter rules corresponds to the one or more packet flow identifiers installed in the corresponding one of the plurality of interface cards.

8. A method of routing packets of a plurality of packet flows through a first router of a packet network comprising the steps of:
- a) collecting 1) network topology information and 2) quality of service (QoS) provisioning information for each one of the plurality of packet flows through one or more routers of the packet network;
- b) determining a network path for said each one of the plurality of packet flows using a general routing optimization method based on the QoS provisioning and network topology information, wherein step b) includes the steps of:
  - b1) computing an effective bandwidth of said each one of the plurality of packet flows;
  - b2) classifying said each one of the plurality of packet flows as either a multiplexable flow or a non-multiplexable flow based on a comparison of the corresponding effective bandwidth with a bandwidth threshold value;
  - b3) reserving i) a first portion of an available capacity of the first router for said each one of the plurality of packet flows classified as the non-multiplexable flow and ii) a second portion of the available capacity for said each one of the plurality of packet flows classified as the multiplexable flow;
  - b4) determining a set of candidate routes, each candidate route corresponding to one of the plurality of packet flows, and at least one of the set of candidate routes allocated to the second portion of the available capacity;
  - b5) calculating each network path based on the set of candidate routes of the plurality of packet flows,
  - b6) classifying said each one of the plurality of packet flows as either a real-time flow or a non-real-time flow based on a delay threshold, and
  - b7) calculating a nodal delay for said each one of the plurality packet flows based on the network topology and its corresponding classification as a real-time flow or a non-real-time flow;
- c) generating a set of one or more filter rules for the first router based on the one or more network paths for the one or more packet flows passing through the router, each filter rule of the set of one or more filter rules defining a physical path for one or more packet flows through the router; and
- d) applying a selected filter rule to each packet-of a corresponding packet flow to cause said each packet to traverse the physical path through the first router in accordance with the selected filter rule, wherein step b4) determines the set of candidate routes by the steps of:
- i) receiving a present value for network revenue and estimates for offered rates of traffic for each class of the one or more packet flows, wherein said each class identifies a set of QoS commitments of the QoS provisioning information associated with each one of the plurality of packet flows assigned to said each class;
- ii) determining route loss probabilities and network sensitivities of said each class based on the nodal delay and effective bandwidth of said each one of the plurality of packet flows, the network topology information, the present value for network revenue, and the estimates for offered rates of traffic;
- iii) adjusting the estimates for the offered rates of traffic of said each class;
- iv) forming a new value for network revenue for said each class;
- v) comparing the new value and the present value for network revenue of said each class to determine whether the new value converges; and
- vi) when the new value converges, determining the set of candidate routes based on the new value of network revenue and the estimates for the offered rates of traffic of said each class; otherwise, setting the new value of network revenue of said each class as the present value and then repeating steps b4(ii) through b4(vi).

9. The method as recited in claim 8, wherein the general routing optimization method is a multicommodity flow (MCF) method, and step a) includes the steps of:
- a1) receiving, in accordance with a network protocol, a portion of the network topology information from each of the one or more routers of the packet network into a database of the router; and
- a2) receiving the QoS provisioning information from a network management database.

10. The method as recited in claim 9, wherein, for step a1), the network protocol is at least one of a link-state protocol and a protocol allowing for communication of network topology information between the one or more routers of the packet network.

11. The method as recited in claim 9, wherein, for step a1), the network protocol is the open shortest path first (OSPF) protocol.

12. The method as recited in claim 8, wherein step b) further includes the steps of determining one or more of the set of candidate routes for said each one of the plurality of packet flows classified as non-multiplexable flows in accordance with a network routing method; and calculating a corresponding network path for each one of the set of candidate routes for said each one of the plurality of packet flows classified as non-multiplexable flows.

13. The method as recited in claim 12, wherein, for step b), the network routing method is a shortest path first (SPF) method.

14. The method as recited in claim 8, wherein step c) includes the steps of:
- c1) deleting a set of running filter rules from at least one interface card of the first router;
- c2) deleting each packet flow identifier and said each class currently installed in the at least one interface card, wherein said each packet flow identifier identifies one or more of the plurality of packet flows and said each class identifies a set of QoS provisioning commitments of the QoS provisioning information associated with said each packet flow identifier;
- c3) allocating a portion of bandwidth of the at least one interface card of the first router to said each class based on said each network path determined in step b);
- c4) installing said each class and said each packet flow identifier assigned to the at least one interface card based on said each network path determined in step b); and c5) installing one or more of the set of new filter rules in said at least one interface card, the one or more of the set of new filter rules corresponding to said each packet flow identifier installed in the interface card.

15. A router of a packet network routing packets of a plurality of packet flows in accordance with an Internet protocol, the router comprising:

a routing processor comprising:
an Open Shortest Path First (OSPF) processing module adapted to receive, in accordance with an OSPF routing protocol, network topology information from one or more routers of the packet network into a link state database of the router,
a link state database adapted to receive QoS provisioning information from a network management database into the link state database, and
a QoS routing module adapted to determine a network path for each one of the plurality of packet flows using a multicommodity flow routing method based on the QoS provisioning information and the network topology information, wherein said each one of the plurality of packet flows is further classified as either a real-time flow or a non-real-time flow based on a delay threshold;

a control processor adapted to generate a set of one or more filter rules for the router based on one or more network paths corresponding to one or more packet flows passing through the router, each filter rule defining a physical path for each one of the one or more packet flows passing through the router;

a packet classifier adapted to apply a selected filter rule to each packet of a corresponding packet flow to cause said each packet to traverse the physical path through the router in accordance with the selected filter rule, and wherein the routing processor comprises a QoS routing module adapted to:
2) compute an effective bandwidth of said each one of the plurality of packet flows;
2) classify said each-one of the plurality of packet flows as either a multiplexable flow or a non-multiplexable flow based on a comparison of the corresponding effective bandwidth with a bandwidth threshold value;
3) reserve i) a first portion of an available capacity of the router for each one of the one or more packet flows passing through the router classified as a non-multiplexable flow and ii) a second portion of the available capacity for said each one of the one or more packet flows passing through the router classified as a multiplexable flow;
4) determine a set of candidate routes, each one of the set of candidate routes corresponding to one of the plurality of packet flows, and at least one of the set of candidate routes allocated to the second portion of the available capacity;
5) calculate the one or more network paths based on the set of candidate routes; and
6) calculate a nodal delay for said each one of the plurality of packet flows based on the network topology information and its corresponding classification as a real-time flow or a non-real-time flow, and wherein the QoS routing module determines the set of candidate routes by:
4(i) receiving a present value for network revenue and estimates for offered rates of traffic for each class of the one or more packet flows, wherein said each class identifies a set of QoS commitments of the QoS provisioning information associated with said each one of the plurality of packet flows assigned to said each class;
4(ii) determining route loss probabilities and network sensitivities for said each class based on the nodal delay and the corresponding effective bandwidth of said each one of the packet flows assigned to each said class, the network topology information, the corresponding present value for network revenue of said each class, and the corresponding estimates for offered rates of traffic of said each class;
4(iii) adjusting the estimates for the offered rates of traffic of said each class;
4(iv) forming a new value for network revenue of said each class;
4(v) comparing the new value and the present value for network revenue of said each class to determine whether the new value converges; and
4(vi) when the new value of said each class converges, determining the set of candidate routes based on the new value of network revenue and the estimates for the offered rates of traffic of said each class; otherwise, setting the new value of network revenue as the present value of said each class and then repeating 4(ii) through 4(vi).

16. An apparatus for routing packets of a plurality of packet flows in a packet network, the apparatus comprising:
a routing processor adapted to:
1) collect network topology information,
2) collect quality of service (QoS) provisioning information for each one of the plurality of packet flows through one or more routers of the packet network, and
3) determine a network path for said each one of the plurality of packet flows using a general routing optimization method based on the QoS provisioning and network topology information;

a control processor adapted to generate, for a first router, a set of one or more filter rules for the first router based on each network path of one or more packet flows passing through the first router, each filter rule defining a physical path through the first router for the one or more packet flows passing through the first router; and a packet classifier adapted to apply a selected filter rule to each packet of a corresponding packet flow passing through the first router to cause said each packet to traverse the physical path through the first router in accordance with the selected filter rule, wherein the routing processor comprises a QoS routing module that calculates a nodal delay for said each one of the plurality of packet flows based on the network topology information and its corresponding classification as a real-time flow or a non-real-time flow based on a delay threshold, the QoS routing module further adapted to:
1) compute an effective bandwidth of said each one of the plurality of packet flows;
2) classify said each one of the plurality of packet flows as either a multiplexable flow or a non-multiplexable flow based on a comparison of the corresponding effective bandwidth with a bandwidth threshold value;
3) reserve i) a first portion of an available capacity of the first router for said each one of the plurality of packet flows classified as a non-multiplexable flow and ii) a second portion of the available capacity for said each one of the plurality of packet flows classified as a multiplexable flow;

4) determine a set of candidate routes, each candidate route corresponding to one of the plurality of packet flows, and at least one of the set of candidate routes allocated to the second portion of the available capacity; and 5) calculate each network path based on the set of candidate routes, and wherein the QoS routing module determines the set of candidate routes by:

i) receiving a present value for network revenue and estimates for offered rates of traffic for each class of the one or more packet flows, wherein said each class identifies a set of QoS commitments of the QoS provisioning information associated with the one or more packet flows assigned to said each class;

ii) determining route loss probabilities and network sensitivities for said each class based on the nodal delay and the corresponding effective bandwidth of each one of the plurality of packet flows assigned to said each class, the network topology information, the corresponding present value for network revenue, and the estimates for offered rates of traffic of said each class;

iii) adjusting the estimates for the offered rates of traffic of said each class;

iv) forming a new value for network revenue of said each class;

v) comparing the new value and the present value for network revenue of said each class to determine whether the new value converges; and vi) when the new value of said each class converges, determining the set of candidate routes based on the new value of network revenue and the estimates for the offered rates of traffic of said each class; otherwise, setting the new value of network revenue of said each class as the present value and then repeating 4(ii) through 4(vi).

17. An apparatus for routing packets of a plurality of packet flows in a packet network, the apparatus comprising:

a routing processor adapted to:

1) collect network topology information, 2) collect quality of service (QoS) provisioning information for each one of the plurality of packet flows through one or more routers of the packet network, and 3) determine a network path for said each one of the plurality of packet flows using a general routing optimization method based on the QoS provisioning and network topology information;

a control processor adapted to generate a set of one or more new filter rules for a first router based on each network path of one or more packet flows passing through the first router, each filter rule defining a physical path through the first router for corresponding ones of the one or more packet flows passing through the first router; and a packet classifier adapted to apply a selected filter rule to each packet of a corresponding packet flow passing through the first router to cause said each packet to traverse the physical path through the first router in accordance with the selected filter rule, wherein the router includes a plurality of interface cards, each one of the plurality of interface cards having a corresponding packet classifier and each one of the plurality of interface cards adapted to interface with a corresponding link of the packet network, and wherein:

the control processor is adapted to:

1) delete a set of running filter rules, each packet flow identifier, and each class from the packet classifier of each interface card of the router, wherein said each packet flow identifier identifies selected ones of the one or more packet flows and said each class identifies a set of QoS provisioning commitments of the QoS provisioning information associated with said each packet flow identifier;

2) allocate a portion of bandwidth of each one of the plurality of interface cards of the first router to said each class based on said each network path determined by the routing processor; and 3) install said each class, said each packet flow identifier, and one or more of a set of new filter rules in each packet classifier and assigned to each corresponding one of the plurality of interface cards, said each packet flow identifier and said each class being assigned to said each corresponding one of the plurality of interface cards based on said each network path determined by the routing processor, wherein the one or more of the set of new filter rules corresponds to said each packet flow identifier installed in the corresponding one of the plurality of interface cards.

18. A method of routing packets of a plurality of packet flows through a first router of a packet network comprising the steps of:

a) collecting 1) network topology information and 2) quality of service (QoS) provisioning information for each packet flow through one or more routers of the packet network;

b) determining a network path for said each packet flow using a general routing optimization method based on the QoS provisioning and network topology information;

c) generating a set of one or more filter rules for the router based on one or more network paths for one or more packet flows passing through the router, each filter rule defining a physical path for one or more packet flows through the first router; and d) applying a selected filter rule to each packet of a corresponding packet flow to cause said each packet to traverse the physical path through the first router in accordance with the selected filter rule, and wherein step b) includes the steps of:

b1) calculating a nodal delay for said each packet flow based on the network topology and a corresponding classification of said each packet flow as either a real-time flow or a non-real-time flow based on a delay threshold;

b2) computing an effective bandwidth of said each packet flow;

b3) classifying said each packet flow as either a multiplexable flow or a non-multiplexable flow based on a comparison of the corresponding effective bandwidth of said each packet-flow with a bandwidth threshold value;

b4) reserving i) a first portion of an available capacity of the first router for each one of the one or more packet flows passing through the first router classified as the non-multiplexable flow and ii) a second portion of the available capacity of the first router for each one of the one or more packet flows passing through the first router classified as the multiplexable flow;

b5) determining a set of candidate routes, each one of the set of candidate routes corresponding to one of the plurality of packet flows, and at least one of the set of candidate routes allocated to the second portion of the available capacity; and b6) calculating the network path for said each packet flow based on the set of candidate routes, and wherein step b5) determines the set of candidate routes by the steps of:

i) receiving a present value for network revenue and estimates for offered rates of traffic for selected ones of the plurality of packet flows assigned to each class, said each class identifying a set of QoS commitments of the QoS provisioning information associated with the selected ones of the plurality of packet flows assigned to said each class;

ii) determining route loss probabilities and network sensitivities of said each class based on the nodal delay and the corresponding effective bandwidth of the selected ones of the plurality of packet flows, the network topology information, the present value for network revenue, and the estimates for offered rates of traffic of said each class;

iii) adjusting the estimates for the offered rates of traffic of said each class;

iv) forming a new value for network revenue of said each class;

v) comparing the new value and the present value for network revenue for said each class to determine whether the new value converges; and vi) when the new value converges, determining the set of candidate routes based on the new value of network revenue and the adjusted estimates for the offered rates of traffic of said each class; otherwise, setting the new value of network revenue as the present value of said each class and then repeating steps b5(ii) through b5(vi).

19. A method of routing packets of a plurality of packet flows through a first router of a packet network comprising the steps of:

a) collecting 1) network topology information and 2) quality of service (QoS) provisioning information for each packet flow through one or more routers of the packet network;

b) determining a network path for said each packet flow using a general routing optimization method based on the QoS provisioning and network topology information;

c) generating a set of one or more new filter rules for the first router based on each network path for one or more packet flows passing through the first router, each filter rule defining a physical path through the first router for corresponding ones of the one or more packet flows passing through the first router; wherein step c) comprises the steps of c1) deleting a set of running filter rules from each interface card of the first router, c2) deleting each packet flow identifier and each class currently installed in said each interface card, wherein said each packet flow identifier identifies selected ones of the one or more packet flows passing through the first router and said each class identifies a set of QoS provisioning commitments of the QoS provisioning information associated with said each packet flow identifier, c3) allocating a portion of bandwidth of said each interface card of the first router to said each class based on said each network path, c4) installing said each class and said each packet flow identifier assigned to said each interface card, said each packet flow identifier and said each class being assigned to said each interface card based on said each network path, and c5) installing one or more of the set of new filter rules in said each interface card, the one or more of the set of new filter rules corresponding to said each packet flow identifier installed in said each interface card; and d) applying a selected filter rule to each packet of a corresponding packet flow passing through the first router to cause said each packet to traverse the physical path through the first router corresponding to the selected filter rule.

\* \* \* \* \*